US012476380B2

(12) United States Patent
Lee et al.

(10) Patent No.: US 12,476,380 B2
(45) Date of Patent: Nov. 18, 2025

(54) CELL UNIT OF FLEXIBLE AND THIN METAMATERIAL ABSORBER HAVING APPROPRIATE OPERATING BANDWIDTH AND USED FOR 5.8GHz AND 10GHz, AND METAMATERIAL ABSORBER INCLUDING SAME

(71) Applicant: IUCF-HYU (INDUSTRY-UNIVERSITY COOPERATION FOUNDATION HANYANG UNIVERSITY), Seoul (KR)

(72) Inventors: Young Pak Lee, Seoul (KR); Haiyu Zheng, Chuncheon-si (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 0 days.

(21) Appl. No.: 18/700,587

(22) PCT Filed: Nov. 15, 2022

(86) PCT No.: PCT/KR2022/017944
§ 371 (c)(1),
(2) Date: Apr. 11, 2024

(87) PCT Pub. No.: WO2023/128267
PCT Pub. Date: Jul. 6, 2023

(65) Prior Publication Data

US 2024/0413543 A1 Dec. 12, 2024

(30) Foreign Application Priority Data

Dec. 30, 2021 (KR) ........................ 10-2021-0192852
Oct. 19, 2022 (KR) ........................ 10-2022-0134612

(51) Int. Cl.
*H01Q 17/00* (2006.01)
*C08L 79/08* (2006.01)

(52) U.S. Cl.
CPC ............ *H01Q 17/008* (2013.01); *C08L 79/08* (2013.01)

(58) Field of Classification Search
CPC .... H01Q 17/00; H01Q 17/001; H01Q 17/002; H01Q 17/004; H01Q 17/005; H01Q 17/007; H01Q 17/008
See application file for complete search history.

(56) References Cited

U.S. PATENT DOCUMENTS

2025/0203833 A1* 6/2025 Lee ...................... H05K 9/0081

FOREIGN PATENT DOCUMENTS

CN 106450795 A 2/2017
CN 111367000 A 7/2020
(Continued)

OTHER PUBLICATIONS

International Search Report issued from the WIPO dated Feb. 22, 2023 for the PCT International Application No. PCT/KR2022/017944.
(Continued)

*Primary Examiner* — Daniel Munoz

(57) ABSTRACT

A unit cell of a metamaterial absorber may include: a first metal layer including a conductor pattern including first to fourth protrusions perpendicular to a square ring part and at least one side of the square ring part and extending inward of the square ring part; a first intermediate layer disposed on a lower surface of the first metal layer and made of polyimide; a resistor layer disposed on a lower surface of the first intermediate layer; a second intermediate layer disposed on a lower surface of the resistor layer and made of polyimide; and a second metal layer disposed on a lower surface of the
(Continued)

second intermediate layer. The resistor layer may increase an operating bandwidth of an operating frequency. The resistor layer may have a thickness of 0.05 mm to 0.15 mm. The resistor layer may have a sheet resistance of 530 $\Omega\cdot sq^{-1}$ to 550 $\Omega\cdot sq^{-1}$.

16 Claims, 20 Drawing Sheets

(56) References Cited

FOREIGN PATENT DOCUMENTS

| | | | | | |
|---|---|---|---|---|---|
| KR | 101109530 | B1 | | 2/2012 | |
| KR | 101617728 | B1 | | 5/2016 | |
| KR | 101627939 | B1 | | 6/2016 | |
| KR | 1020070000483 | A | | 1/2017 | |
| WO | WO-2017114131 | A1 | * | 7/2017 | ............. H01Q 21/00 |

OTHER PUBLICATIONS

Written Opinion of International Search Authority issued from the WIPO dated Feb. 22, 2023 for the PCT International Application No. PCT/KR2022/017944.

* cited by examiner

TE MODE

| Inclination angle [degree] | Center frequency [GHz] | An electromagnetic wave absorbance |
|---|---|---|
| 0° | 5.8 | 0.9980 |
| 15° | 5.8 | 0.9993 |
| 30° | 5.8 | 0.9991 |
| 45° | 5.8 | 0.9823 |

TM MODE

| Inclination angle [degree] | Center frequency [GHz] | An electromagnetic wave absorbance |
|---|---|---|
| 0° | 5.8 | 0.9980 |
| 15° | 5.8 | 0.9975 |
| 30° | 5.8 | 0.9923 |
| 45° | 5.8 | 0.9740 |

TE MODE

| Inclination angle [degree] | Center frequency [GHz] | An electromagnetic wave absorbance |
|---|---|---|
| 0° | 10 | 0.9984 |
| 15° | 10 | 0.9995 |
| 30° | 10 | 0.9988 |
| 45° | 10 | 0.9810 |

TM MODE

| Inclination angle [degree] | Center frequency [GHz] | An electromagnetic wave absorbance |
|---|---|---|
| 0° | 10 | 0.9983 |
| 15° | 10 | 0.9978 |
| 30° | 10 | 0.9941 |
| 45° | 10 | 0.9773 |

CELL UNIT OF FLEXIBLE AND THIN METAMATERIAL ABSORBER HAVING APPROPRIATE OPERATING BANDWIDTH AND USED FOR 5.8GHz AND 10GHz, AND METAMATERIAL ABSORBER INCLUDING SAME

CROSS-REFERENCE TO RELATED APPLICATIONS

This application is a National Stage Entry of PCT International Application No. PCT/KR2022/017944, which was filed on Nov. 15, 2022, and which claims priority from and the benefit of Korean Patent Application 10-2021-0192852, filed with the Korean Intellectual Property Office on Dec. 30, 2021 and Korean Patent Application 10-2022-0134612, filed with the Korean Intellectual Property Office on Oct. 19, 2022. The disclosure of the above patent application is hereby incorporated by reference in its entirety.

TECHNICAL FIELD

The present disclosure relates to a metamaterial absorber, and more specifically, to a unit cell of a flexible and thin metamaterial absorber having a tailored operating bandwidth at 5.8 GHz and 10 GHz, and a metamaterial absorber including the same.

BACKGROUND ART

The existing electromagnetic wave absorber is a device that greatly reduces reflected or transmitting electromagnetic waves by absorbing the electromagnetic waves incident onto a surface thereof and dissipating the absorbed electromagnetic wave as heat, and is used for purposes such as blocking electromagnetic waves. In general, the electromagnetic wave absorber is mainly based on a mixed material such as a ferrite material. However, the electromagnetic wave absorber based on a mixed material has the disadvantage of being bulky, heavy, and expensive. Therefore, recently, an electromagnetic wave absorber using a metamaterial has been proposed.

The metamaterial is an artificially designed material that includes both electric and magnetic elements so as to have properties not found in nature, and has an ability to easily absorb electromagnetic waves. In other words, the metamaterial absorber refers to an electromagnetic wave absorber implemented using the metamaterial with a high electromagnetic wave absorbance.

However, while a conventional metamaterial absorber has a high absorbance of electromagnetic waves perpendicularly incident thereto, the absorbance thereof of the electromagnetic waves incident thereto at angles other than 90 degrees decreases. The absorbance thereof decreases when the electromagnetic wave is incident thereto at a large inclination angle.

Furthermore, an operating frequency of the conventional metamaterial absorber is limited to a specific frequency, so that there is no operating bandwidth thereof or the operating bandwidth thereof is very narrow. Therefore, the electromagnetic wave absorbance of the metamaterial absorber is maintained at a high level only at a certain frequency in a form of a single peak.

Furthermore, the conventional metamaterial absorber is not flexible, and has a large thickness, and a manufacturing cost thereof is relatively high.

DETAILED DISCLOSURE OF INVENTION

Technical Problem

A purpose of the present disclosure is to provide a unit cell of a metamaterial absorber for 5.8 GHz and 10 GHz that maintains an electromagnetic wave absorbance at a constant level even when an angle of incidence at which the incident electromagnetic wave is incident thereto changes.

Another purpose of the present disclosure is to provide a unit cell of a metamaterial absorber for 5.8 GHz and 10 GHz having an operating frequency of a constant operating bandwidth and an electromagnetic wave absorbance maintained at a constant level within the operating bandwidth range.

Still another purpose of the present disclosure is to provide a unit cell of a metamaterial absorber for 5.8 GHz and 10 GHz that is flexible, thin, and has a relatively low manufacturing cost.

However, the purpose of the present disclosure is not limited to the above-mentioned purposes, and may be expanded in various ways without departing from the idea and scope of the present disclosure.

Technical Solution

A unit cell of a metamaterial absorber according to an embodiment for achieving the purpose of the present disclosure may include a first metal layer including a conductive pattern, wherein the conductive pattern includes a square ring, and first to fourth protrusions extending respectively from four sides of the square ring and inwardly of the square ring, and in a perpendicular manner thereto; a first intermediate layer disposed on a lower surface of the first metal layer and made of polyimide; a resistor layer disposed on a lower surface of the first intermediate layer; a second intermediate layer disposed on a lower surface of the resistor layer and made of polyimide; and a second metal layer disposed on a lower surface of the second intermediate layer. The resistor layer may increase an operating bandwidth of an operating frequency of the unit cell of the metamaterial absorber. The thickness of the resistor layer may be in a range of 0.05 mm to 0.15 mm, and a sheet resistance of the resistor layer may be in a range of 530 $\Omega\cdot sq^{-1}$ to 550 $\Omega\cdot sq^{-1}$.

In one embodiment, the operating bandwidth of the operating frequency has a center frequency of 5.8 GHz and includes a band of 5.55 GHz to 6.05 GHz. The unit cell of the metamaterial absorber has an electromagnetic wave absorbance of 97% or greater at an incident angle of 45° of the electromagnetic wave thereto in the operating bandwidth range.

In one embodiment, the conductive pattern of the first metal layer includes a first conductive pattern, wherein a length of at least one side of the square ring of the first conductive pattern may be in a range of 11 mm to 14 mm, a width of the square ring of the first conductive pattern may be in a range of 0.1 mm to 0.2 mm, a width of each of the first to fourth protrusions of the first conductive pattern may be in a range of 0.2 mm to 0.4 mm, and a length of each of the first to fourth protrusions of the first conductive pattern may be in a range of 4 mm to 5 mm, wherein a thickness of the first metal layer may be in a range of 30 μm to 40 μm.

In one embodiment, a longitudinal length of the first intermediate layer may be in a range of 11 mm to 14 mm, a transverse length of the first intermediate layer may be in a range of 11 mm to 14 mm, and a thickness of the first intermediate layer may be in a range of 1.5 mm to 1.9 mm.

In one embodiment, a longitudinal length of the resistor layer may be in a range of 11 mm to 14 mm, and a transverse length of the resistor layer may be in a range of 11 mm to 14 mm.

In one embodiment, a longitudinal length of the second intermediate layer may be in a range of 11 mm to 14 mm, a transverse length of the second intermediate layer may be in a range of 11 mm to 14 mm, and a thickness of the second intermediate layer may be in a range of 0.4 mm to 0.6 mm.

In one embodiment, a dielectric constant of each of the first intermediate layer and the second intermediate layer may be 3.5, wherein a dielectric loss tangent of each of the first intermediate layer and the second intermediate layer may be 0.0027.

In one embodiment, a longitudinal length of the second metal layer may be in a range of 11 mm to 14 mm, a transverse length of the second metal layer may be in a range of 11 mm to 14 mm, and a thickness of the second metal layer may be in a range of 30 μm to 40 μm.

In one embodiment, the operating bandwidth of the operating frequency has a center frequency of 10 GHz and includes a 9.5 GHz to 10.5 GHz band, wherein the unit cell of the metamaterial absorber has an electromagnetic wave absorbance of 97% or greater at an incident angle of 45° of the electromagnetic wave thereto in the operating bandwidth range.

In one embodiment, the conducive pattern of the first metal layer includes a second conductive pattern, wherein a length of at least one side of the square ring of the second conductive pattern may be in a range of 8 mm to 11 mm, a width of the square ring may be in a range of 0.1 mm to 0.2 mm, a width of each of the first to fourth protrusions of the second conductive pattern may be in a range of 0.2 mm to 0.4 mm, and a length of each of the first to fourth protrusions of the second conductive pattern may be in a range of 2.0 mm to 2.4 mm, wherein a thickness of the first metal layer may be in a range of 30 μm to 40 μm.

In one embodiment, a longitudinal length of the first intermediate layer may be in a range of 8 mm to 11 mm, a transverse length of the first intermediate layer may be in a range of 8 mm to 11 mm, and a thickness of the first intermediate layer may be in a range of 1.0 mm to 1.2 mm.

In one embodiment, a longitudinal length of the resistor layer may be in a range of 8 mm to 11 mm, and a transverse length of the resistor layer may be in a range of 8 mm to 11 mm.

In one embodiment, a longitudinal length of the second intermediate layer may be in a range of 8 mm to 11 mm, a transverse length of the second intermediate layer may be in a range of 8 mm to 11 mm, and a thickness of the second intermediate layer may be in a range of 0.4 mm to 0.6 mm.

In one embodiment, a dielectric constant of each of the first intermediate layer and the second intermediate layer may be 3.5, wherein a dielectric loss tangent of each of the first intermediate layer and the second intermediate layer may be 0.0027.

In one embodiment, a longitudinal length of the second metal layer may be in a range of 8 mm to 11 mm, a transverse length of the second metal layer may be in a range of 8 mm to 11 mm, and a thickness of the second metal layer may be in a range of 30 μm to 40 μm.

A metamaterial absorber according to an embodiment for achieving another purpose of the present disclosure includes a plurality of unit cells, wherein the plurality of unit cells are arranged in the same plane to form a plate structure, wherein each of the plurality of unit cells includes a first metal layer including a conductive pattern, wherein the conductive pattern includes a square ring, and first to fourth protrusions extending respectively from four sides of the square ring and inwardly of the square ring, and in a perpendicular manner thereto; a first intermediate layer disposed on a lower surface of the first metal layer and made of polyimide; a resistor layer disposed on a lower surface of the first intermediate layer; a second intermediate layer disposed on a lower surface of the resistor layer and made of polyimide; and a second metal layer disposed on a lower surface of the second intermediate layer, wherein the resistor layer increases an operating bandwidth of an operating frequency of the unit cell of the metamaterial absorber, wherein a thickness of the resistor layer may be in a range of 0.05 mm to 0.15 mm, wherein a sheet resistance of the resistor layer may be in a range of 530 ∀·sq$^{-1}$ to 550 Ω·sq$^{-1}$.

Technical Effect

The unit cell of the metamaterial absorber and the metamaterial absorber according to the present disclosure may maintain the electromagnetic wave absorbance at a constant level even when the angle of incidence of the incident electromagnetic wave thereto changes.

Furthermore, the unit cell of the metamaterial absorber and the metamaterial absorber according to the present disclosure may have an operating bandwidth of a constant operating frequency and may keep the electromagnetic wave absorbance at a constant level within the operating bandwidth range.

Furthermore, the unit cell of the metamaterial absorber and the metamaterial absorber according to the present disclosure may be flexible, thin, and have a relatively low manufacturing cost.

Therefore, the unit cell of the metamaterial absorber and the metamaterial absorber may maximize the electromagnetic wave absorption efficiency.

For example, when the unit cell of the metamaterial absorber according to the present disclosure is used in an automatic toll collection system such as High-pass in the 5.8 GHz band, performance degradation and malfunctions of information and communication devices due to multiple signals reflected from the ceiling of the building, pillars, etc. around the automatic toll collection system are minimized, such that smooth passage of the vehicle may be secured in the automatic fare collection system.

For example, when the unit cell of the metamaterial absorber according to the present disclosure is used on a naval ship using the 10 GHz band, false targets of the radar due to reflected waves from masts or piers around the naval ship are reduced, so that the navy ship's radar performance may be improved.

However, the effects of the present disclosure are not limited to the effects as described above, and may be expanded in various ways without departing from the idea and scope of the present disclosure.

BEST MODE

Figure 1:
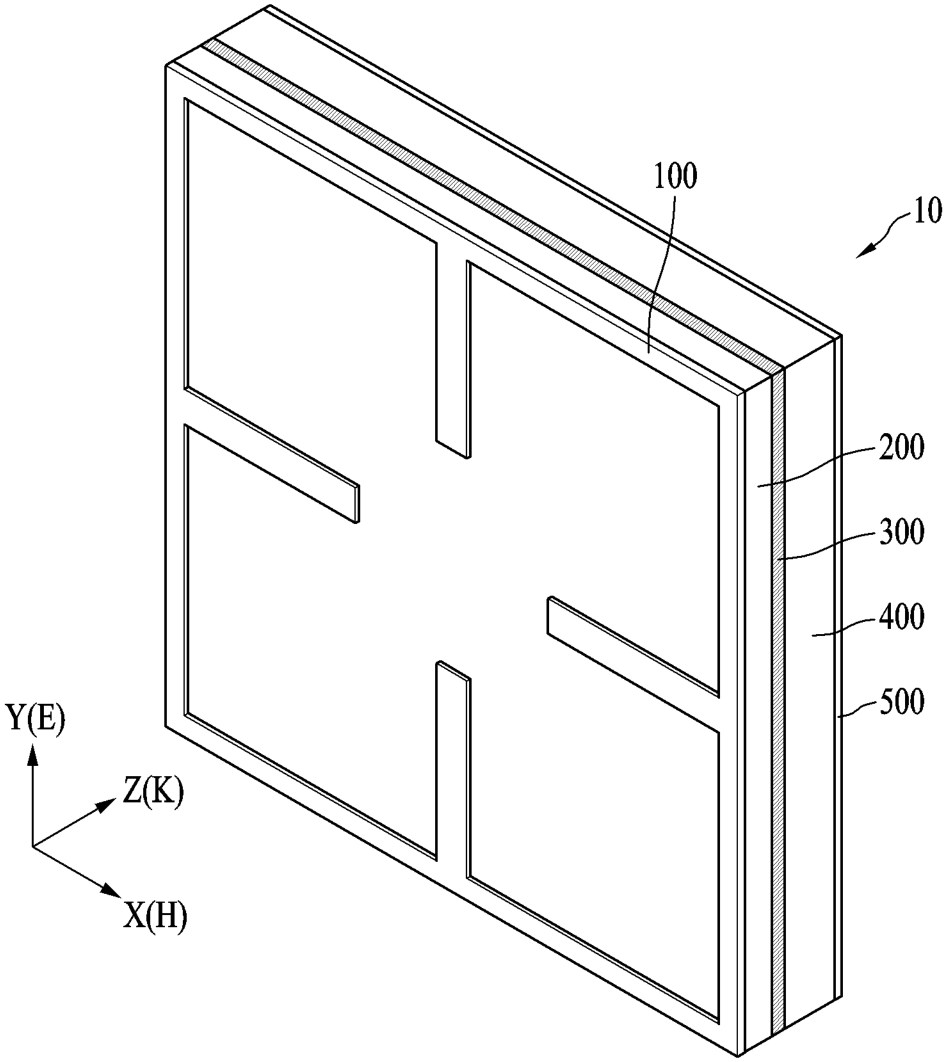
FIG. 1 is a perspective view showing a unit cell of a metamaterial absorber in accordance with the present disclosure.

Hereinafter, various embodiments of the present disclosure will be described with reference to the accompanying drawings.

It should be understood that the embodiments and the terms used therein are not intended to limit the technological features set forth herein to particular embodiments and the present disclosure includes various changes of, equivalents, and/or replacements to the embodiment.

In the following description of various embodiments, when a detailed description of a related known function or configuration is determined to unnecessarily obscure the gist of the disclosure, the detailed description will be omitted.

The terms described below are terms defined in consideration of functions in various embodiments, and may vary depending on intention of the user or operator or custom. Therefore, the definition should be made based on the contents throughout this specification.

In relation to the description of the drawings, similar reference numerals may be used for similar components.

A singular expression may include a plural expression, unless the context clearly indicates otherwise.

In this document, expressions such as "A or B" or "at least one of A and/or B" may include all possible combinations of items listed together.

Expressions such as "first," "second, etc. may modify corresponding components regardless of order or importance, and may be used only to distinguish one component from another component and does not limit the corresponding components.

When one (e.g., a first) component is "connected (functionally or communicatively)" or "linked" to another (e.g., second) component, this means that one component may be directly connected to another component or may be connected indirectly thereto via still another component (e.g., a third component).

As used herein, "configured to" may be used interchangeably with, for example, "adapted to", "able to", "modified to", "designed to", "suitable for", "suitable for", "capable of," or "designed to" in hardware or software, depending on the context.

In some contexts, the expression "a device configured to" may mean that the device is "capable of" together with other devices or components.

For example, the phrase "processor configured to perform A, B, and C" may mean a dedicated processor (e.g. an embedded processor) for performing a corresponding operation, or a general-purpose processor (e.g. a CPU or an application processor) capable of performing corresponding operations by executing one or more software programs stored in a memory device.

Furthermore, the term 'or' means 'inclusive or' rather than 'exclusive or'.

That is, unless otherwise stated or clear from the context, the expression 'x uses a or b' means one of natural inclusive permutations.

Terms such as '. . . unit' or '. . . er' used hereinafter refer to a unit that processes at least one function or operation, and may be implemented based on hardware, software, or a combination of hardware and software.

Figure 2:
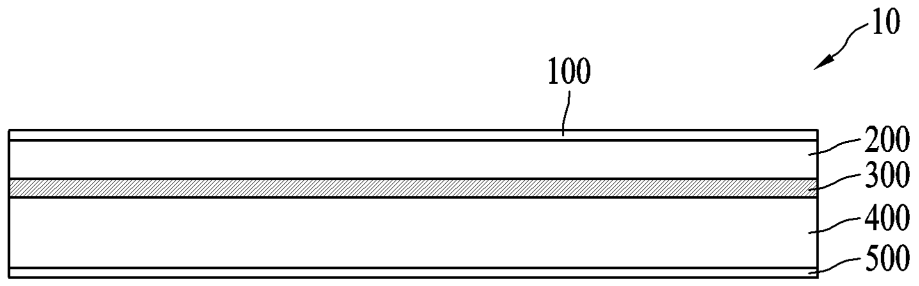
FIG. 2 is a cross-sectional view showing a stacked structure of a unit cell of a metamaterial absorber in FIG. 1.

FIG. 1 is a perspective view showing a unit cell 10 of a metamaterial absorber in accordance with the present disclosure, and FIG. 2 is a cross-sectional view showing a stacked structure of the unit cell 10 of the metamaterial absorber in FIG. 1.

Referring to FIGS. 1 and 2, the unit cell 10 of the metamaterial absorber in accordance with the present disclosure includes a first metal layer 100, a first intermediate layer 200, a resistor layer 300, a second intermediate layer 400, and a second metal layer 500.

For example, as shown in FIG. 2, the unit cell 10 of the metamaterial absorber may have a five-layer structure in which the first metal layer 100, the first intermediate layer 200, the resistor layer 300, the second intermediate layer 400, and the second metal layer 500 are stacked.

Specifically, the unit cell 10 of the metamaterial absorber may include the first metal layer 100 including a conductive pattern, wherein the conductive pattern includes a square ring, and first to fourth protrusions extending respectively from four sides of the square ring and inwardly of the square ring, and in a perpendicular manner thereto, the first intermediate layer 200 disposed on a lower surface of the first metal layer 100 and made of polyimide, the resistor layer 300 disposed on a lower surface of the first intermediate layer 200, the second intermediate layer 400 disposed on a lower surface of the resistor layer 300 and made of polyimide, and the second metal layer 500 disposed on a lower surface of the second intermediate layer 400.

An operating frequency of a conventional metamaterial absorber is limited to a specific frequency, so that there is no operating bandwidth thereof or the operating bandwidth thereof is very narrow. Therefore, the electromagnetic wave absorbance of the metamaterial absorber is maintained at a high level only at a certain frequency in a form of a single peak.

The unit cell 10 of the metamaterial absorber in accordance with the present disclosure has an operating bandwidth of a constant operating frequency, and the electromagnetic wave absorbance thereof may be maintained at a constant level within the operating bandwidth range.

Specifically, the resistor layer 300 may increase the operating bandwidth of the operating frequency in relation to electromagnetic wave absorption. For this purpose, a thickness of the resistor layer 300 may be in a range of 0.05 mm to 0.15 mm, and a sheet resistance of the resistor layer 300 may be in a range of 530 $\Omega \cdot sq^{-1}$ to 550 $\Omega \cdot sq^{-1}$.

Furthermore, the unit cell 10 of the metamaterial absorber in accordance with the present disclosure may maintain the electromagnetic wave absorbance at a constant level even when the angle of incidence of the incident electromagnetic wave thereto changes.

Furthermore, the unit cell 10 of the metamaterial absorber according to the present disclosure may be flexible, thin, and relatively low in a manufacturing cost.

Hereinafter, an embodiment of a unit cell 10*a* of a metamaterial absorber for 5.8 GHz in accordance with the present disclosure is described with reference to FIGS. 3 to 10, and an embodiment of a unit cell 10*b* of a metamaterial absorber for 10 GHz in accordance with the present disclosure is described with reference to FIGS. 11 to 18.

Figure 3:
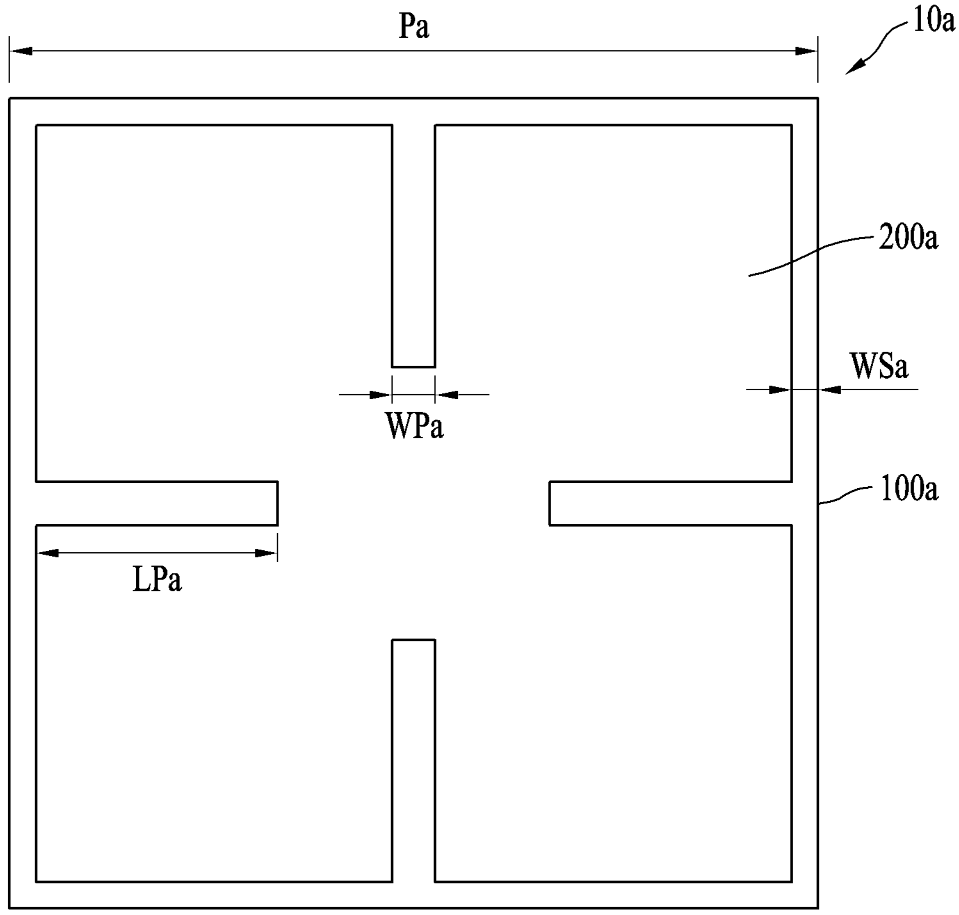
FIG. 3 is a front view of a unit cell of a metamaterial absorber for 5.8 GHz according to embodiments of the present disclosure.
Figure 4:
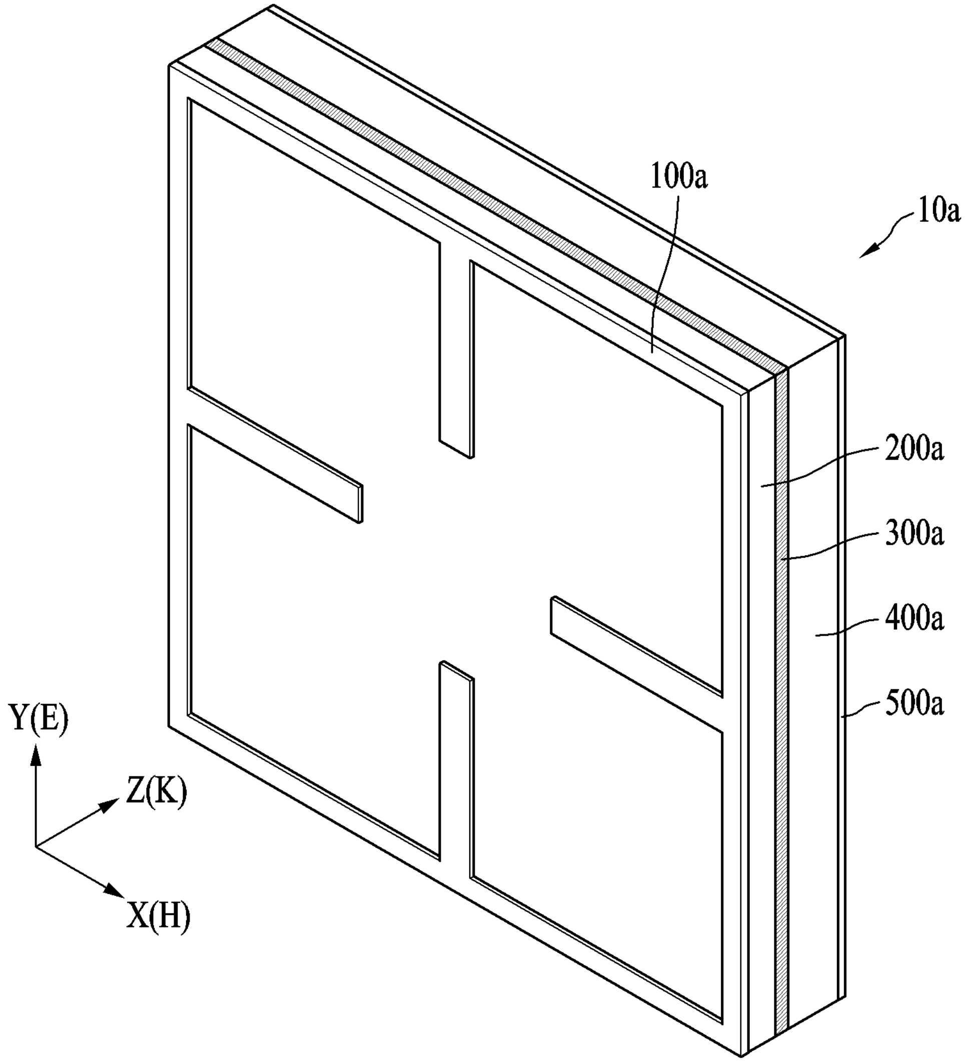
FIG. 4 is a perspective view of a unit cell of a metamaterial absorber for 5.8 GHz in FIG. 3.
Figure 5:
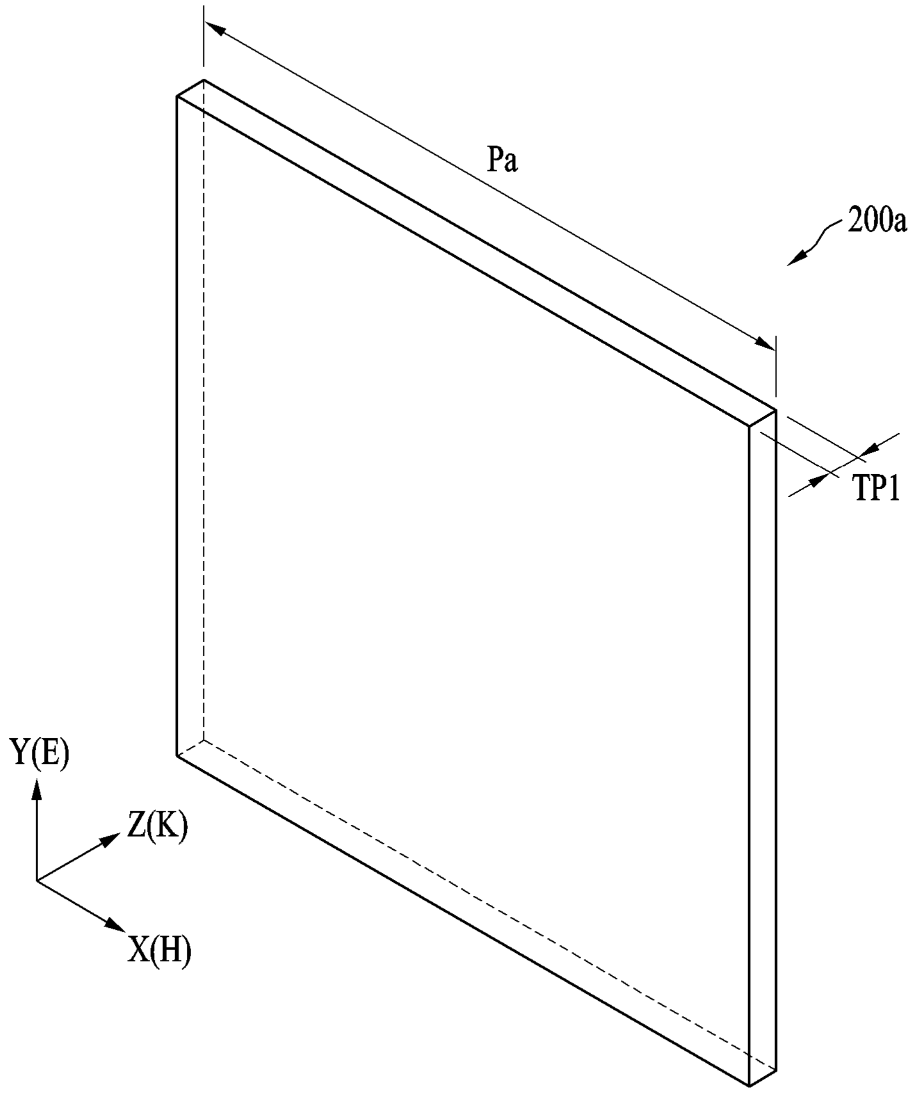
FIG. 5 is a diagram showing a first intermediate layer in a separated manner from the perspective view of FIG. 4.
Figure 6:
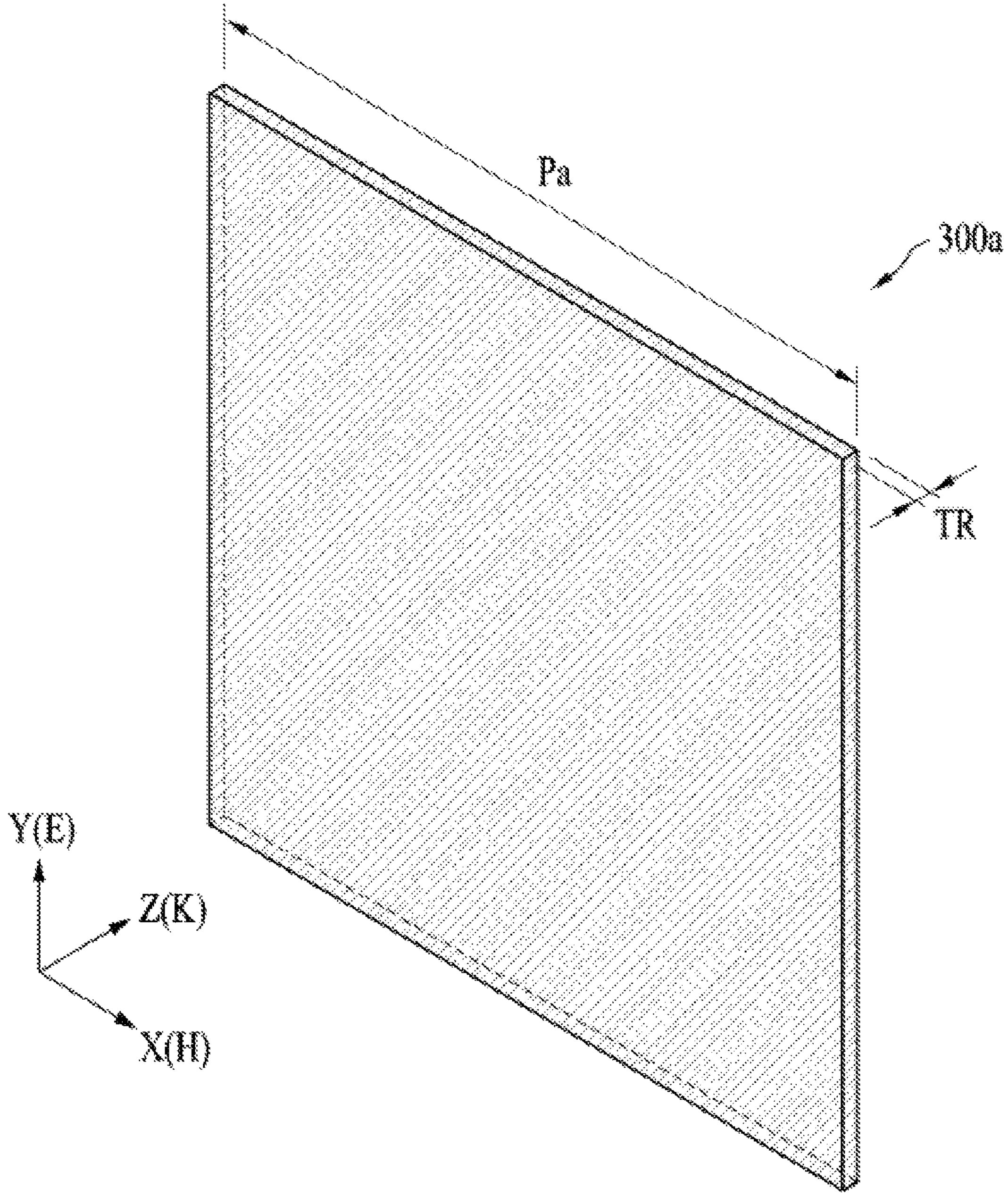
FIG. 6 is a diagram showing a resistor layer in a separated manner from the perspective view in FIG. 4.
Figure 7:
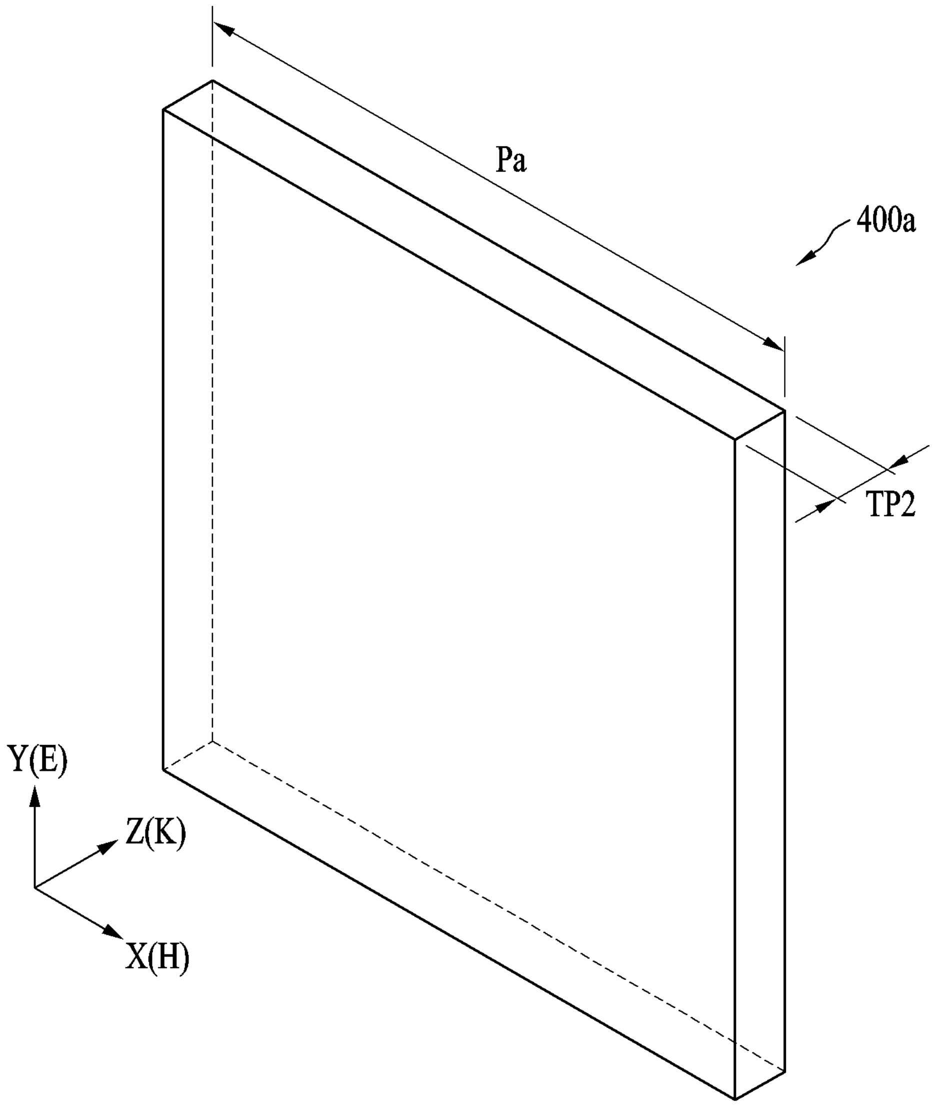
FIG. 7 is a diagram showing a second intermediate layer in a separated manner from the perspective view in FIG. 4.
Figure 8:
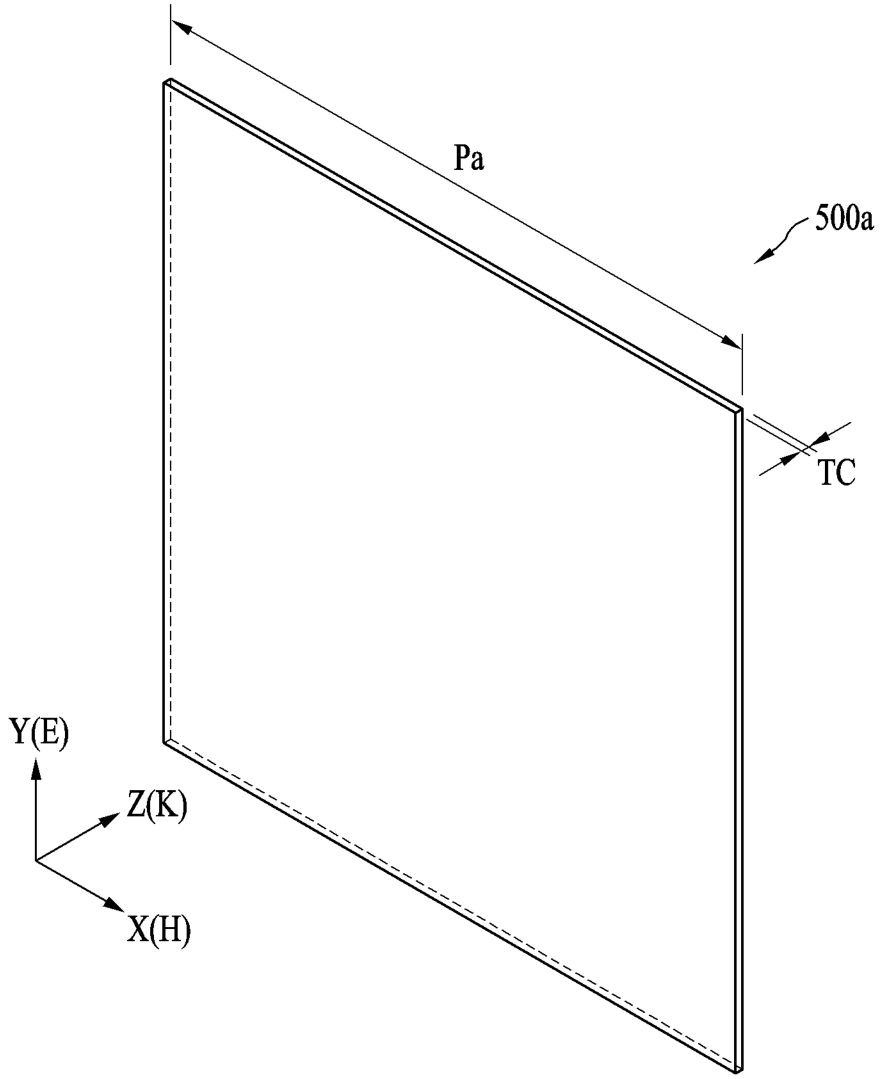
FIG. 8 is a diagram showing a second metal layer in a separated manner from the perspective view in FIG. 4.

FIG. 3 is a front view of the unit cell 10*a* of the metamaterial absorber for 5.8 GHz according to embodiments of the present disclosure, and FIG. 4 is a perspective view of the unit cell 10*a* of the metamaterial absorber for 5.8 GHz in FIG. 3. FIG. 5 is a diagram showing a first intermediate layer 200*a* in a separated manner from the perspective view of FIG. 4, and FIG. 6 is a diagram showing a resistor layer 300*a* in a separated manner from the perspective view of FIG. 4. FIG. 7 is a diagram showing a second intermediate layer 400*a* in a separated manner from the perspective view of FIG. 4, and FIG. 8 is a diagram showing a second metal layer 500*a* in a separated manner from the perspective view of FIG. 4.

Referring to FIG. 3 and FIG. 4, the unit cell 10*a* of the metamaterial absorber in accordance with the present disclosure has optimized size, shape, and conductive pattern, so that the electromagnetic wave absorbance thereof may be maximized in the 5.8 GHz band.

The operating frequency of the unit cell 10*a* of the metamaterial absorber may have a constant operating bandwidth. For example, the operating bandwidth of the operating frequency may have a center frequency of 5.8 GHz and may be in a range of 5.55 GHz to 6.05 GHz.

The unit cell 10*a* of the metamaterial absorber may have an electromagnetic wave absorbance of 97% or greater at an incident angle of 45° of the electromagnetic wave within the above operating bandwidth range.

Specifically, the unit cell 10*a* of the metamaterial absorber may include a first metal layer 100*a* including a first conductive pattern, wherein the first conductive pattern includes a square ring, and first to fourth protrusions extending respectively from four sides of the square ring and inwardly of the square ring, and in a perpendicular manner thereto, the first intermediate layer 200*a* disposed on a lower surface of the first metal layer 100*a* and made of polyimide, a resistor layer 300*a* disposed on a lower surface of the first intermediate layer 200*a*, the second intermediate layer 400*a* disposed on a lower surface of the resistor layer 300*a* and made of polyimide, and the second metal layer 500*a* disposed on a lower surface of the second intermediate layer 400*a*.

The metamaterial absorber unit cell may minimize the reflection of electromagnetic waves in the 5.8 GHz band therefrom depending on a scheme in which the conductive pattern of the first metal layer 100*a* is designed. In other words, since the impedance of the atmosphere is 1, a total impedance of the first conductive pattern may be designed to be 1 in the 5.8 GHz band.

The first metal layer 100*a* may include the first conductive pattern including the square ring and the protrusions therefrom.

For example, the first conductive pattern may include the square ring and the first to fourth protrusions.

A length Pa of at least one side of the square ring may be in a range of 11 mm to 14 mm.

A width WSa of the square ring may be in a range of 0.1 mm to 0.2 mm.

The width WPa of each of the first to fourth protrusions may be in a range of 0.2 mm to 0.4 mm.

A length LPa of each of the first to fourth protrusions may be in a range of 4 mm to 5 mm.

A thickness of the first metal layer 100*a* may be in a range of 30 μm to 40 μm.

Referring to FIGS. 4 and 5, the first intermediate layer 200*a* may be disposed on a lower surface of the first metal layer 100*a* and may be made of polyimide.

For example, a longitudinal length Pa of the first intermediate layer 200*a* may be in a range of 11 mm to 14 mm. A transverse length of the first intermediate layer 200*a* may be in a range of 11 mm to 14 mm. A thickness TP1 of the first intermediate layer 200*a* may be in a range of 1.5 mm to 1.9 mm.

Referring to FIGS. 4 and 6, the resistor layer 300*a* may be disposed on a lower surface of the first intermediate layer 200*a*. The resistor layer 300*a* may has a constant sheet resistance to increase the operating bandwidth of the operating frequency in relation to electromagnetic wave absorption. For example, the sheet resistance of the resistor layer 300*a* may be in a range of 530 $\Omega \cdot sq^{-1}$ to 550 $\Omega \cdot sq^{-1}$.

A thickness TR of the resistor layer 300*a* may be in a range of 0.05 mm to 0.15 mm. For example, the resistor layer 300*a* may be designed to be 0.1 mm thick to minimize an effect on the flexibility of the unit cell 10*a* of the metamaterial absorber.

The longitudinal length Pa of the resistor layer 300*a* may be in a range of 11 mm to 14 mm. The transverse length of the resistor layer 300*a* may be in a range of 11 mm to 14 mm.

According to the configuration of the resistor layer 300*a*, the unit cell 10*a* of the metamaterial absorber may maintain the operating frequency in which the electromagnetic waves are absorbed thereby in a 5.8 GHz±0.25 GHz band even when the angle of incidence of the electromagnetic waves thereto changes.

Referring to FIGS. 4 and 7, the second intermediate layer 400*a* may be disposed on a lower surface of the resistor layer 300*a* and may be made of polyimide.

For example, the longitudinal length Pa of the second intermediate layer 400*a* may be in a range of 11 mm to 14 mm. The transverse length of the second intermediate layer 400*a* may be in a range of 11 mm to 14 mm. A thickness TP2 of the second intermediate layer 400*a* may be in a range of 0.4 mm to 0.6 mm.

The unit cell 10*a* of the metamaterial absorber includes the first intermediate layer 200*a* and the second intermediate layer 400*a* made of polyimide, and thus may be flexible, thin, and have a relatively low manufacturing cost.

The first intermediate layer 200*a* and the second intermediate layer 400*a* may electrically confine and store therein the electromagnetic wave incident onto the unit cell 10*a* of the metamaterial absorber, and may attenuate the electromagnetic wave in the 5.8 GHz band. For this purpose, a size of each of the first intermediate layer 200*a* and the second intermediate layer 400*a* included in the unit cell 10*a* of the metamaterial absorber may be 12.5×12.5 $mm^2$.

For example, a dielectric constant of each of the first intermediate layer 200*a* and the second intermediate layer 400*a* may be 3.5. A dielectric loss tangent of each of the first intermediate layer 200*a* and the second intermediate layer 400*a* may be 0.0027.

Depending on the configuration of the first intermediate layer 200*a* and the second intermediate layer 400*a*, the unit cell 10*a* of the metamaterial absorber may have an absorbance of 99% or greater of the electromagnetic wave perpendicularly incident thereto in the 5.8 GHz band.

Referring to FIGS. 4 and 8, the second metal layer 500*a* may be disposed on a lower surface of the second intermediate layer 400*a*. The second metal layer 500*a* may perform the function of preventing the electromagnetic wave entering the unit cell 10*a* of the metamaterial absorber from escaping out thereof. The second metal layer 500*a* may be made of copper.

For example, the longitudinal length Pa of the second metal layer 500*a* may be in a range of 11 mm to 14 mm. The transverse length of the second metal layer 500*a* may be in a range of 11 mm to 14 mm. A thickness TC of the second metal layer 500*a* may be in a range of 30 μm to 40 μm.

Figure 9:
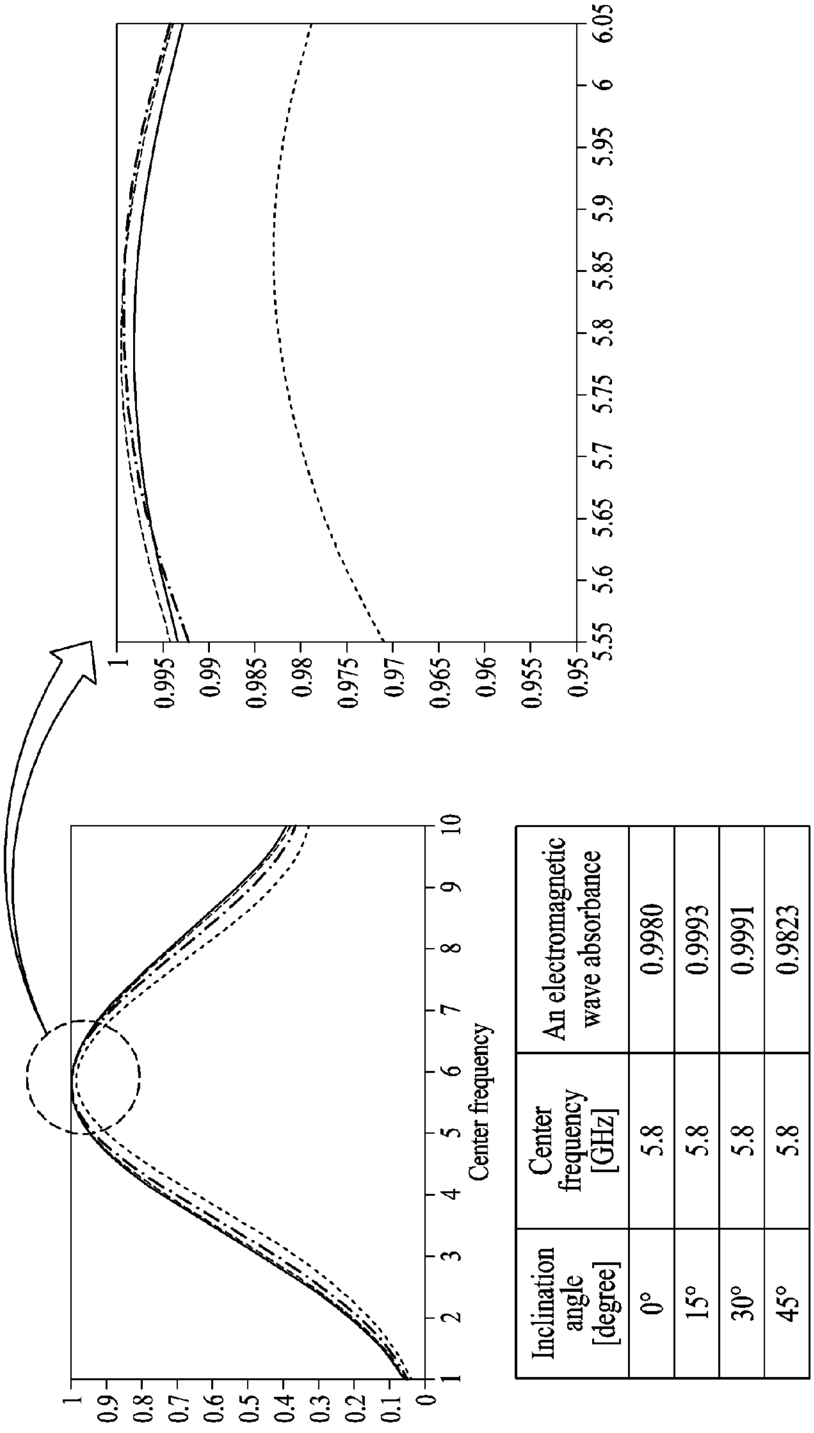
FIG. 9 is a graph showing an electromagnetic wave absorbance based on an angle of incidence in a 5.55 GHz to 6.05 GHz band when an electromagnetic wave polarized in a TE mode is incident onto a unit cell of a metamaterial absorber for 5.8 GHz in FIG. 3.

FIG. 9 is a graph showing an electromagnetic wave absorbance based on an angle of incidence of the electromagnetic wave in the 5.55 GHz to 6.05 GHz band when an electromagnetic wave polarized in a TE mode is incident onto the unit cell 10*a* of the metamaterial absorber for 5.8 GHz in FIG. 3.

As shown in FIG. 9, the unit cell 10*a* of the metamaterial absorber may maintain an electromagnetic wave absorbance of 97% or greater of electromagnetic waves polarized in a TE mode even when the angle of incidence of the electromagnetic waves thereto changes in the 5.55 GHz to 6.05 GHz band.

When the electromagnetic wave polarized in a TE mode is perpendicularly incident thereto (or incident thereto at) 0° thereto, the unit cell 10*a* of the metamaterial absorber exhibits an electromagnetic wave absorbance of 99.80% or greater in the 5.55 GHz to 6.05 GHz band.

When an electromagnetic wave polarized in a TE mode is incident thereto at 15°, the unit cell 10*a* of the metamaterial absorber exhibits an electromagnetic wave absorbance greater than or equal to 99.93% in the 5.55 GHz to 6.05 GHz band.

When an electromagnetic wave polarized in a TE mode is incident thereto at 30°, the unit cell 10*a* of the metamaterial absorber exhibits an electromagnetic wave absorbance greater than or equal to 99.91% in the 5.55 GHz to 6.05 GHz band.

When an electromagnetic wave polarized in a TE mode is incident thereto at 45°, the unit cell 10*a* of the metamaterial absorber exhibits an electromagnetic wave absorbance greater than or equal to 98.23% in the 5.55 GHz to 6.05 GHz band.

Figure 10:
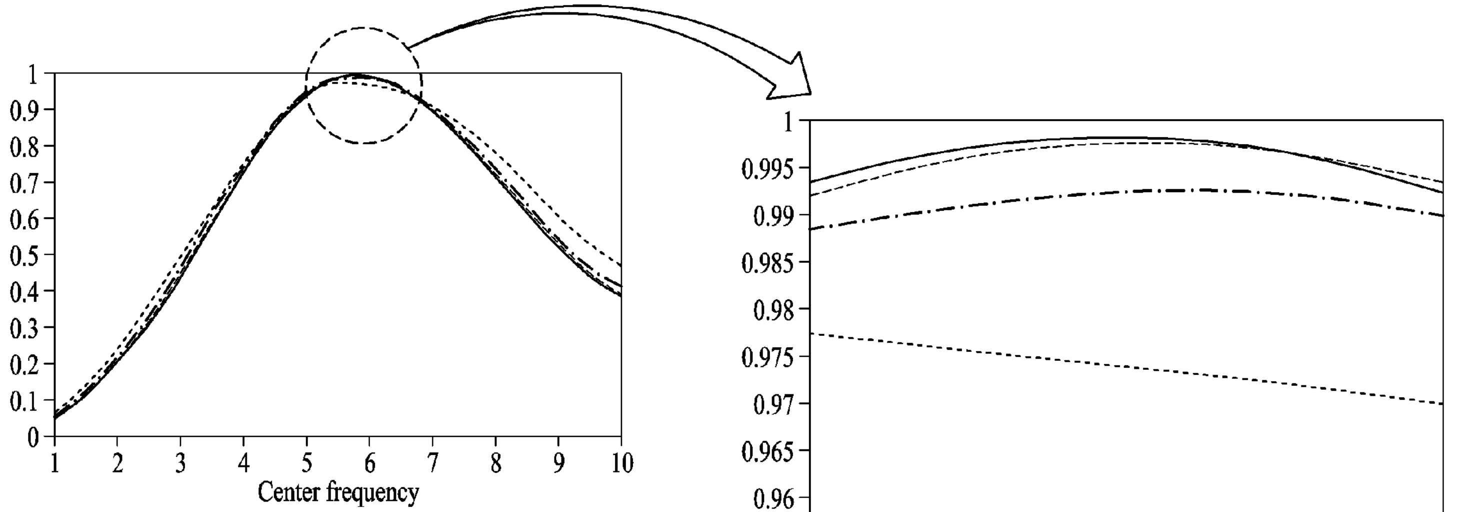
FIG. 10 is a graph showing an electromagnetic wave absorbance based on an angle of incidence in a 5.55 GHz to 6.05 GHz band when an electromagnetic wave polarized in a TM mode is incident onto a unit cell of a metamaterial absorber for 5.8 GHz in FIG. 3.

FIG. 10 is a graph showing an electromagnetic wave absorbance based on an angle of incidence of the electromagnetic wave in the 5.55 GHz to 6.05 GHz band when an electromagnetic wave polarized in a TM mode is incident onto the unit cell 10*a* of the metamaterial absorber for 5.8 GHz in FIG. 3.

As shown in FIG. 10, the unit cell 10*a* of the metamaterial absorber may maintain an electromagnetic wave absorbance greater than or equal to 97% of the electromagnetic waves polarized in a TM mode even when the angle of incidence of the electromagnetic waves thereto changes in the 5.55 GHz to 6.05 GHz band.

When an electromagnetic wave polarized in a TM mode is perpendicularly incident thereto (or incident thereto at) 0°, the unit cell 10*a* of the metamaterial absorber exhibits an electromagnetic wave absorbance greater than or equal to 99.80% in the 5.55 GHz to 6.05 GHz band.

When an electromagnetic wave polarized in a TM mode is incident thereto at 15°, the unit cell 10*a* of the metamaterial absorber exhibits an electromagnetic wave absorbance greater than or equal to 99.75% in the 5.55 GHz to 6.05 GHz band.

When an electromagnetic wave polarized in a TM mode is incident thereto at 30°, the unit cell 10*a* of the metamaterial absorber exhibits an electromagnetic wave absorbance greater than or equal to 99.23% in the 5.55 GHz to 6.05 GHz band.

When an electromagnetic wave polarized in a TM mode is incident thereto at 45°, the unit cell 10*a* of the metamaterial absorber exhibits an electromagnetic wave absorbance greater than or equal to 97.40% in the 5.55 GHz to 6.05 GHz band.

In this way, the unit cell 10*a* of the metamaterial absorber according to the present disclosure may maintain the electromagnetic wave absorbance at a constant level even when the incident angle of the incident electromagnetic wave thereto changes in the 5.8 GHz band. Furthermore, the unit cell 10*a* of the metamaterial absorber according to the present disclosure has an operating frequency of 5.8 GHz±0.25 GHz and may maintain the electromagnetic wave absorbance at a constant level within the operating bandwidth range. Furthermore, the unit cell 10*a* of the metamaterial absorber according to the present disclosure may be flexible, thin, and have a relatively low manufacturing cost. Therefore, the unit cell 10*a* of the metamaterial absorber may maximize the electromagnetic wave absorption efficiency.

For example, when the unit cell 10*a* of the metamaterial absorber according to the present disclosure is used in an automatic toll collection system such as High-pass in the 5.8 GHz band, performance degradation and malfunctions of information and communication devices due to multiple signals reflected from the ceiling of the building, pillars, etc. around the automatic toll collection system are minimized, such that smooth passage of the vehicle may be secured in the automatic fare collection system.

Figure 11:
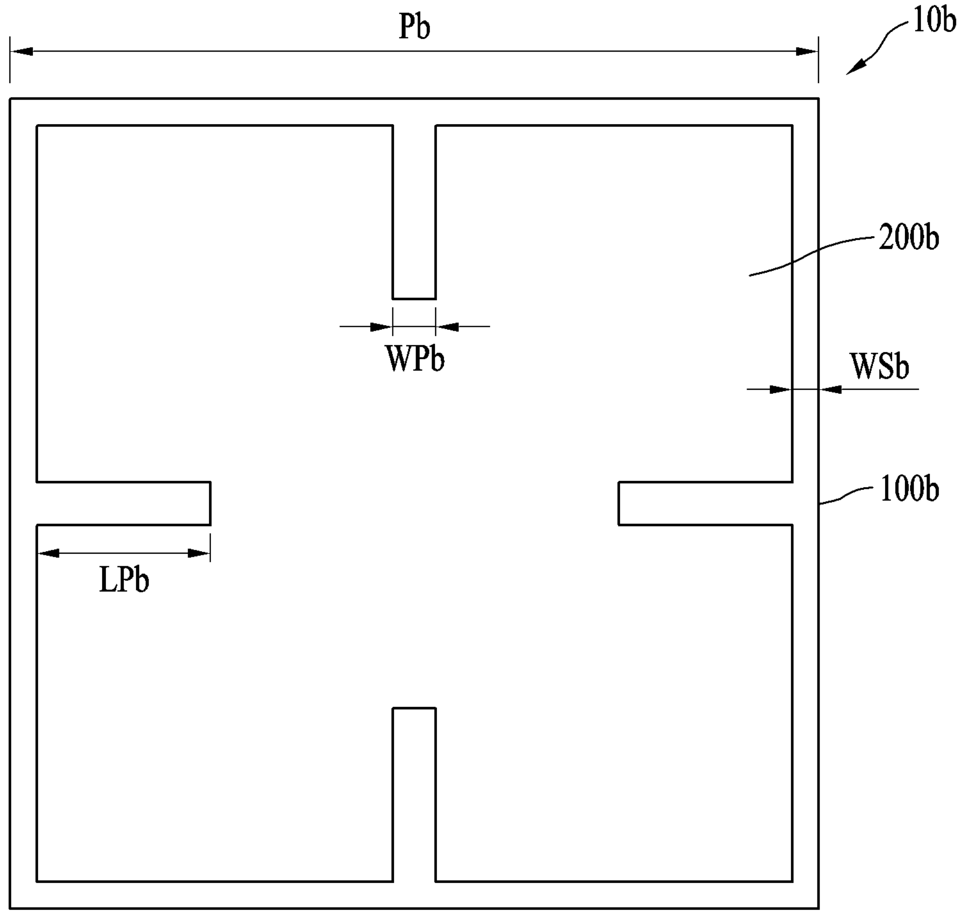
FIG. 11 is a front view of a unit cell of a metamaterial absorber for 10 GHz according to embodiments of the present disclosure.
Figure 12:
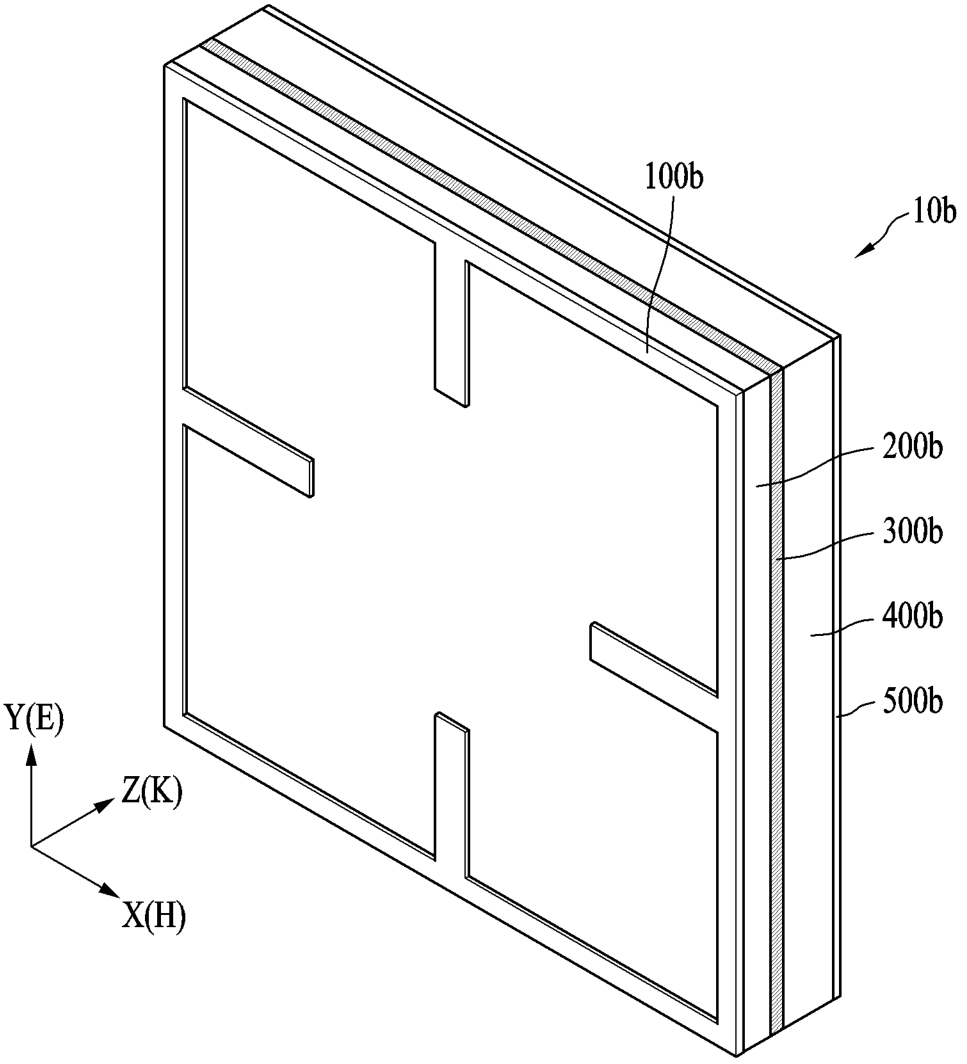
FIG. 12 is a perspective view of a unit cell of a metamaterial absorber for 10 GHz in FIG. 11.
Figure 13:
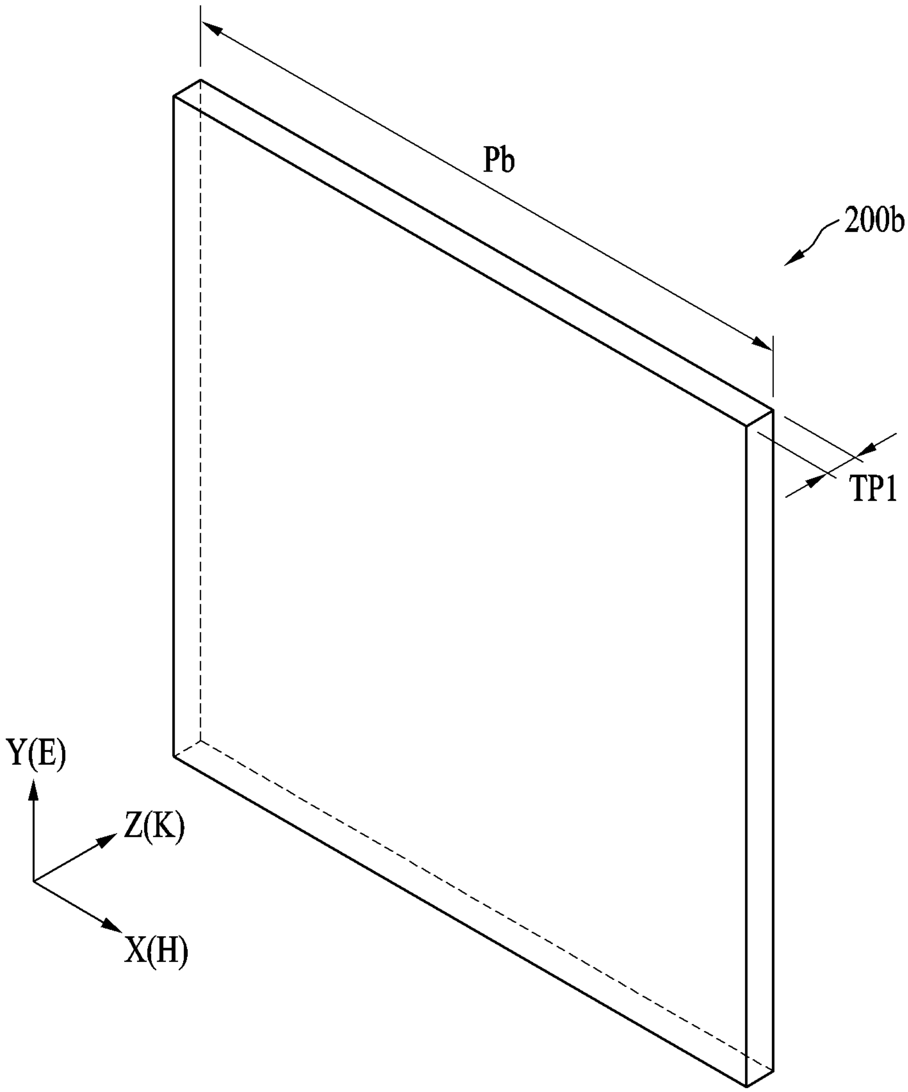
FIG. 13 is a diagram showing a first intermediate layer in a separated manner from the perspective view of FIG. 12.
Figure 14:
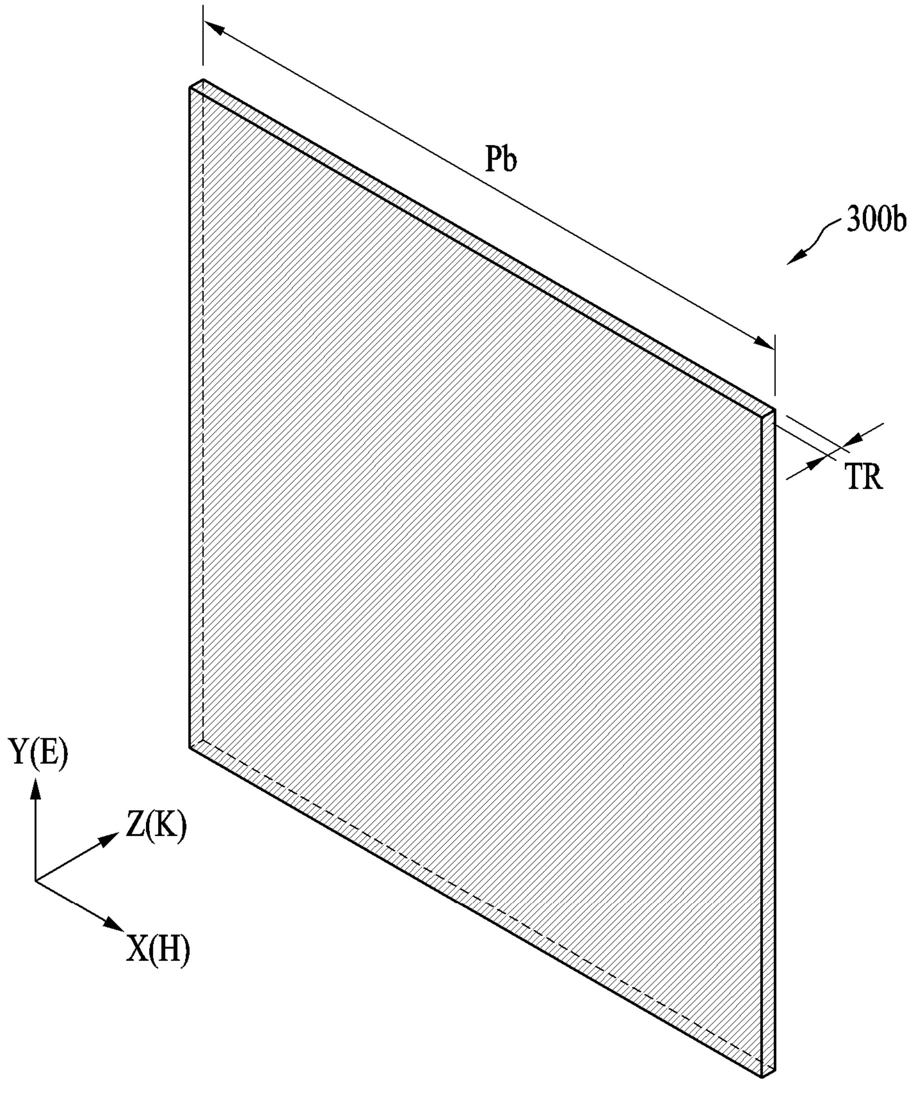
FIG. 14 is a diagram showing a resistor layer in a separated manner from the perspective view in FIG. 12.
Figure 15:
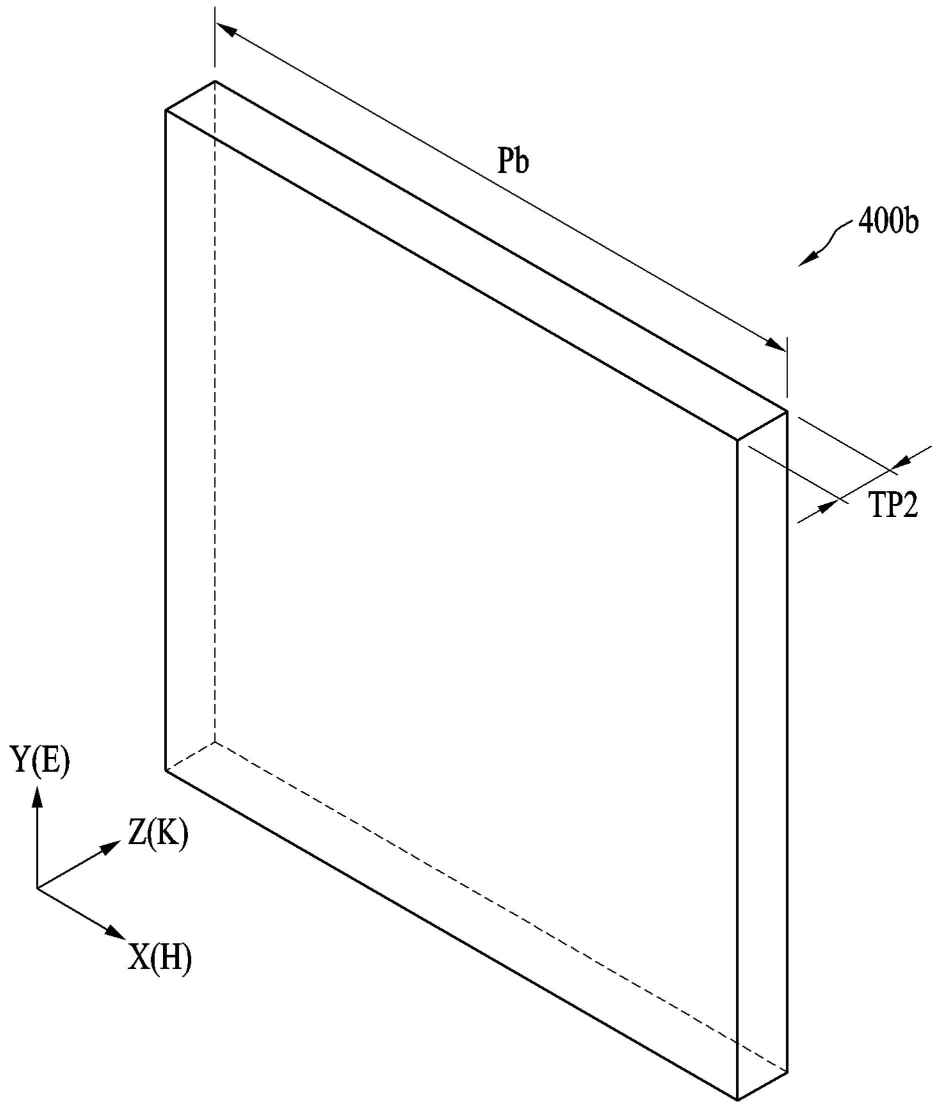
FIG. 15 is a diagram showing a second intermediate layer in a separated manner from the perspective view in FIG. 12.
Figure 16:
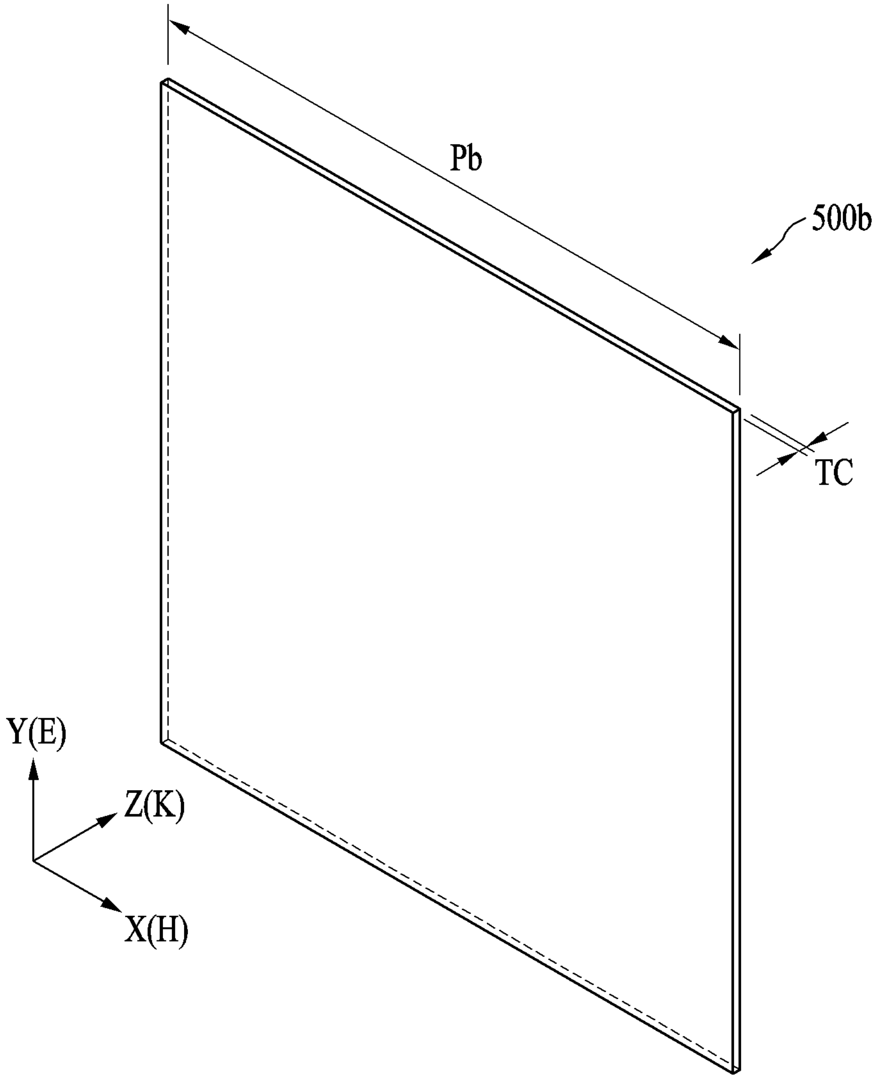
FIG. 16 is a diagram showing a second metal layer in a separated manner from the perspective view in FIG. 12.

FIG. 11 is a front view of the unit cell 10*b* of the metamaterial absorber for 10 GHz according to the embodiments of the present disclosure, and FIG. 12 is a perspective view of the unit cell 10*b* of the metamaterial absorber for 10 GHz in FIG. 11, FIG. 13 is a diagram showing a first intermediate layer 200*b* in a separated manner from the perspective view of FIG. 12, and FIG. 14 is a diagram showing a resistor layer 300*b* in a separated manner from the perspective view of FIG. 12. FIG. 15 is a diagram showing a second intermediate layer 400*b* in a separated manner from the perspective view of FIG. 12, and FIG. 16 is a diagram showing a second metal layer 500*b* in a separated manner from the perspective view of FIG. 12.

Referring to FIG. 11 and FIG. 12, the unit cell 10*b* of the metamaterial absorber in accordance with the present disclosure has optimized size, shape, and conductive pattern, so that the electromagnetic wave absorbance thereof may be maximized in the 10 GHz band.

The operating frequency of the unit cell 10*b* of the metamaterial absorber may have a constant operating bandwidth. For example, the operating bandwidth of the operating frequency may have a center frequency of 10 GHz and may be a band of 9.5 GHz to 10.5 GHz.

The unit cell 10*b* of the metamaterial absorber may have an electromagnetic wave absorbance of 97% or greater at an incident angle of 45° of the electromagnetic wave within the above operating bandwidth range.

Specifically, the unit cell 10*b* of the metamaterial absorber may include a first metal layer 100*b* including a second conductive pattern, wherein the second conductive pattern includes a square ring, and first to fourth protrusions extending respectively from four sides of the square ring and inwardly of the square ring, and in a perpendicular manner thereto, the first intermediate layer 200*b* disposed on a lower surface of the first metal layer 100*b* and made of polyimide, the resistor layer 300*b* disposed on a lower surface of the first intermediate layer 200*b*, a second intermediate layer 400*b* disposed on a lower surface of the resistor layer 300*b* and made of polyimide, and the second metal layer 500*b* disposed on a lower surface of the second intermediate layer 400*b*.

The metamaterial absorber unit cell may minimize the reflection of electromagnetic waves in the 10 GHz band therefrom depending on a scheme in which the conductive pattern of the first metal layer 100*b* is designed. In other words, since the impedance of the atmosphere is 1, the total impedance of the second conductive pattern may be designed to be 1 in the 10 GHz band.

The first metal layer 100*b* may include the second conductive pattern including the square ring and the protrusions.

For example, the second conductive pattern may include the square ring and the first to fourth protrusions.

A length Pb of at least one side of the square ring may be in a range of 8 mm to 11 mm.

A width WSb of the square ring may be in a range of 0.1 mm to 0.2 mm.

A width WPb of each of the first to fourth protrusions may be in a range of 0.2 mm to 0.4 mm.

A length LPb of each of the first to fourth protrusions may be in a range of 2.0 mm to 2.4 mm.

A thickness of the first metal layer 100*b* may be in a range of 30 μm to 40 μm.

Referring to FIGS. 12 and 13, the first intermediate layer 200*b* may be disposed on a lower surface of the first metal layer 100*b* and may be made of polyimide.

For example, the longitudinal length Pb of the first intermediate layer 200*b* may be in a range of 8 mm to 11 mm. The transverse length of the first intermediate layer 200*b* may be in a range of 8 mm to 11 mm. A thickness TP1 of the first intermediate layer 200*b* may be in a range of 1.0 mm to 1.2 mm.

Referring to FIGS. 12 and 14, the resistor layer 300*b* may be disposed on a lower surface of the first intermediate layer 200*b*. The resistor layer 300*b* may have a constant sheet resistance to increase the operating bandwidth of the operating frequency in relation to electromagnetic wave absorption. For example, the sheet resistance of the resistor layer 300*b* may be in a range of 530 $\Omega\cdot sq^{-1}$ to 550 $\Omega\cdot sq^{-1}$.

A thickness TR of the resistor layer 300*b* may be in a range of 0.05 mm to 0.15 mm. For example, the resistor layer 300*b* may be designed to be 0.1 mm thick to minimize the effect on the flexibility of the unit cell 10*b* of the metamaterial absorber.

The longitudinal length Pa of the resistor layer 300*b* may be in a range of 8 mm to 11 mm. The transverse length of the resistor layer 300*b* may be in a range of 8 mm to 11 mm.

According to the configuration of the resistor layer 300*b*, the unit cell 10*b* of the metamaterial absorber may maintain the operating frequency in which the electromagnetic waves are absorbed thereby in the 10 GHz±0.5 GHz band even when the angle of incidence of the electromagnetic waves thereto changes.

Referring to FIGS. 12 and 15, the second intermediate layer 400*b* may be disposed on a lower surface of the resistor layer 300*b* and may be made of polyimide.

For example, the longitudinal length Pa of the second intermediate layer 400*b* may be in a range of 8 mm to 11 mm. The transverse length of the second intermediate layer 400*b* may be in a range of 8 mm to 11 mm. A thickness TP2 of the second intermediate layer 400*b* may be in a range of 0.4 mm to 0.6 mm.

The unit cell 10*b* of the metamaterial absorber includes the first intermediate layer 200*b* and the second intermediate layer 400*b* made of polyimide, and thus may be flexible, thin, and have a relatively low manufacturing cost.

The first intermediate layer 200*b* and the second intermediate layer 400*b* may electrically confine and store therein the electromagnetic wave incident onto the unit cell 10*b* of the metamaterial absorber, and may attenuate the electromagnetic wave in the 10 GHz band. For this purpose, a size of each of the first intermediate layer 200*b* and the second intermediate layer 400*b* included in the unit cell 10*b* of the metamaterial absorber may be 9.5×9.5 $mm^2$.

For example, the dielectric constant of each of the first intermediate layer 200*b* and the second intermediate layer 400*b* may be 3.5. The dielectric loss tangent of each of the first intermediate layer 200*b* and the second intermediate layer 400*b* may be 0.0027.

Depending on the configuration of the first intermediate layer 200*b* and the second intermediate layer 400*b*, the unit cell 10*b* of the metamaterial absorber in the 10 GHz band may have an electromagnetic wave absorbance greater than or equal to 99% of a perpendicularly incident electromagnetic wave thereto.

Referring to FIGS. 12 and 16, the second metal layer 500*b* may be disposed on a lower surface of the second intermediate layer 400*b*. The second metal layer 500*b* may perform the function of preventing the electromagnetic wave entering the unit cell 10*b* of the metamaterial absorber from escaping out thereof. The second metal layer 500*b* may be made of copper.

For example, the longitudinal length Pa of the second metal layer 500*b* may be in a range of 8 mm to 11 mm. The transverse length of the second metal layer 500*b* may be in a range of 8 mm to 11 mm. A thickness TC of the second metal layer 500*b* may be in a range of 30 μm to 40 μm.

Figure 17:
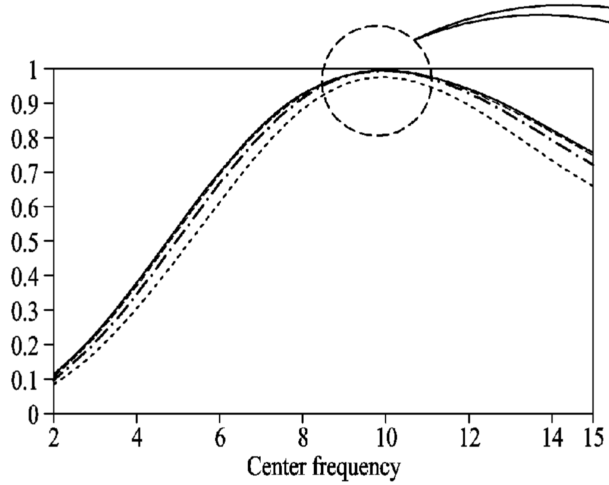
FIG. 17 is a graph showing an electromagnetic wave absorbance based on an angle of incidence in a 9.5 GHz to 10.5 GHz band when an electromagnetic wave polarized in a TE mode is incident onto a unit cell of a metamaterial absorber for 10 GHz in FIG. 11.
Figure 17:
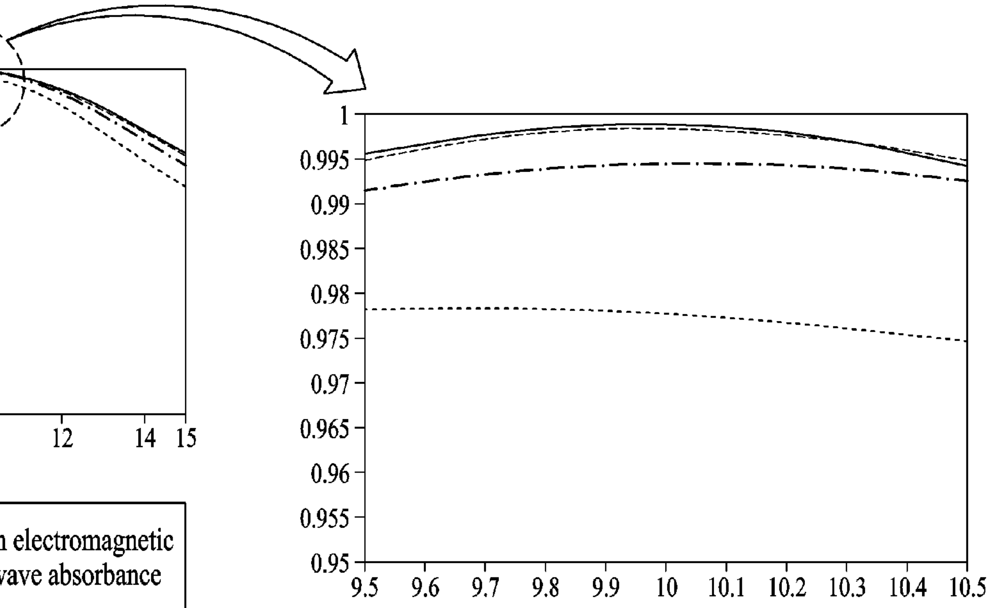

FIG. 17 is a graph showing an electromagnetic wave absorbance based on an angle of incidence of the electromagnetic wave in the 9.5 GHz to 10.5 GHz band when an electromagnetic wave polarized in a TE mode is incident onto the unit cell 10*b* of the metamaterial absorber for 10 GHz in FIG. 11.

As shown in FIG. 17, the unit cell 10*b* of the metamaterial absorber may maintain an electromagnetic wave absorbance greater than or equal to 97% of the electromagnetic waves polarized in a TE mode even when the incident angle changes in the 9.5 GHz to 10.5 GHz band.

When an electromagnetic wave polarized in a TE mode is perpendicularly incident thereto (or incident thereto at) 0°, the unit cell 10*b* of the metamaterial absorber exhibits an electromagnetic wave absorbance greater than or equal to 99.84% in the 9.5 GHz to 10.5 GHz band.

When an electromagnetic wave polarized in a TE mode is incident thereto at 15°, the unit cell 10*b* of the metamaterial absorber exhibits an electromagnetic wave absorbance greater than or equal to 99.95% in the 9.5 GHz to 10.5 GHz band.

When an electromagnetic wave polarized in a TE mode is incident thereto at 30°, the unit cell 10*b* of the metamaterial absorber exhibits an electromagnetic wave absorbance greater than or equal to 99.88% in the 9.5 GHz to 10.5 GHz band.

When an electromagnetic wave polarized in a TE mode is incident thereto at 45°, the unit cell 10*b* of the metamaterial absorber exhibits an electromagnetic wave absorbance greater than or equal to 98.10% in the 9.5 GHz to 10.5 GHz band.

Figure 18:
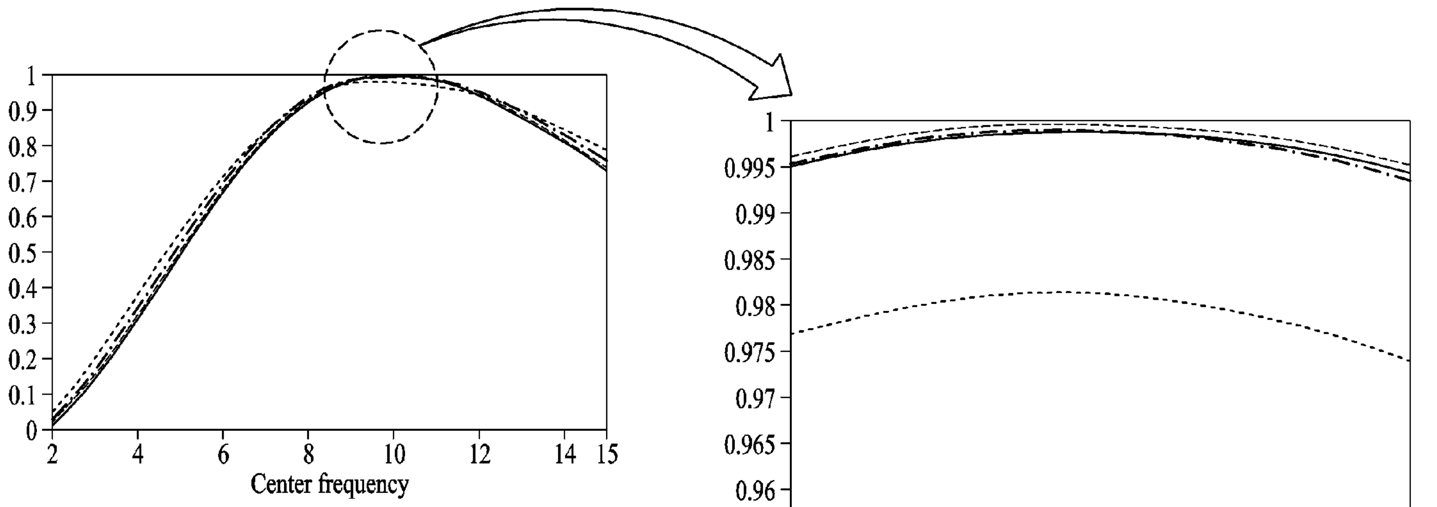
FIG. 18 is a graph showing an electromagnetic wave absorbance based on an angle of incidence of the electromagnetic wave in the 9.5 GHz to 10.5 GHz band when an electromagnetic wave polarized in a TM mode is incident onto a unit cell of a metamaterial absorber for 10 GHz in FIG. 11.

FIG. 18 is a graph showing an electromagnetic wave absorbance based on an angle of incidence of the electromagnetic wave in the 9.5 GHz to 10.5 GHz band when an electromagnetic wave polarized in a TM mode is incident onto the unit cell 10*b* of the metamaterial absorber for 10 GHz in FIG. 11.

As shown in FIG. 10, the unit cell 10*b* of the metamaterial absorber may maintain an electromagnetic wave absorbance greater than or equal to 97% of the electromagnetic waves polarized in a TM mode even when the angle of incidence of the electromagnetic waves thereto changes in the 9.5 GHz to 10.5 GHz band.

When an electromagnetic wave polarized in a TM mode is perpendicularly incident thereto (or incident thereto at) 0°, the unit cell 10*b* of the metamaterial absorber exhibits an electromagnetic wave absorbance greater than or equal to 99.83% in the 9.5 GHz to 10.5 GHz band.

When an electromagnetic wave polarized in a TM mode is incident thereto at 15°, the unit cell 10*b* of the metamaterial absorber exhibits an electromagnetic wave absorbance greater than or equal to 99.78% in the 9.5 GHz to 10.5 GHz band.

When an electromagnetic wave polarized in a TM mode is incident thereto at 30°, the unit cell 10*b* of the metamaterial absorber exhibits an electromagnetic wave absorbance greater than or equal to 99.41% in the 9.5 GHz to 10.5 GHz band.

When an electromagnetic wave polarized in a TM mode is incident thereto at 45°, the unit cell 10*b* of the metamaterial absorber exhibits an electromagnetic wave absorbance greater than or equal to 97.73% in the 9.5 GHz to 10.5 GHz band.

In this way, the unit cell 10*b* of the metamaterial absorber according to the present disclosure may maintain the electromagnetic wave absorbance at a constant level even when the incident angle of the incident electromagnetic wave thereto changes in the 10 GHz band. Furthermore, the unit cell 10*b* of the metamaterial absorber according to the present disclosure has an operating bandwidth of 10 GHz±0.5 GHz, and the electromagnetic wave absorbance thereof may be kept constant within the operating bandwidth range. Furthermore, the unit cell 10*b* of the metamaterial absorber according to the present disclosure may be flexible, thin, and have a relatively low manufacturing cost. Therefore, the unit cell 10*b* of the metamaterial absorber may maximize the electromagnetic wave absorption efficiency.

For example, when the unit cell 10*b* of the metamaterial absorber according to the present disclosure is used on a naval ship using the 10 GHz band, false targets of the radar due to reflected waves from masts or piers around the naval ship are reduced, so that the navy ship's radar performance may be improved.

Figure 19:
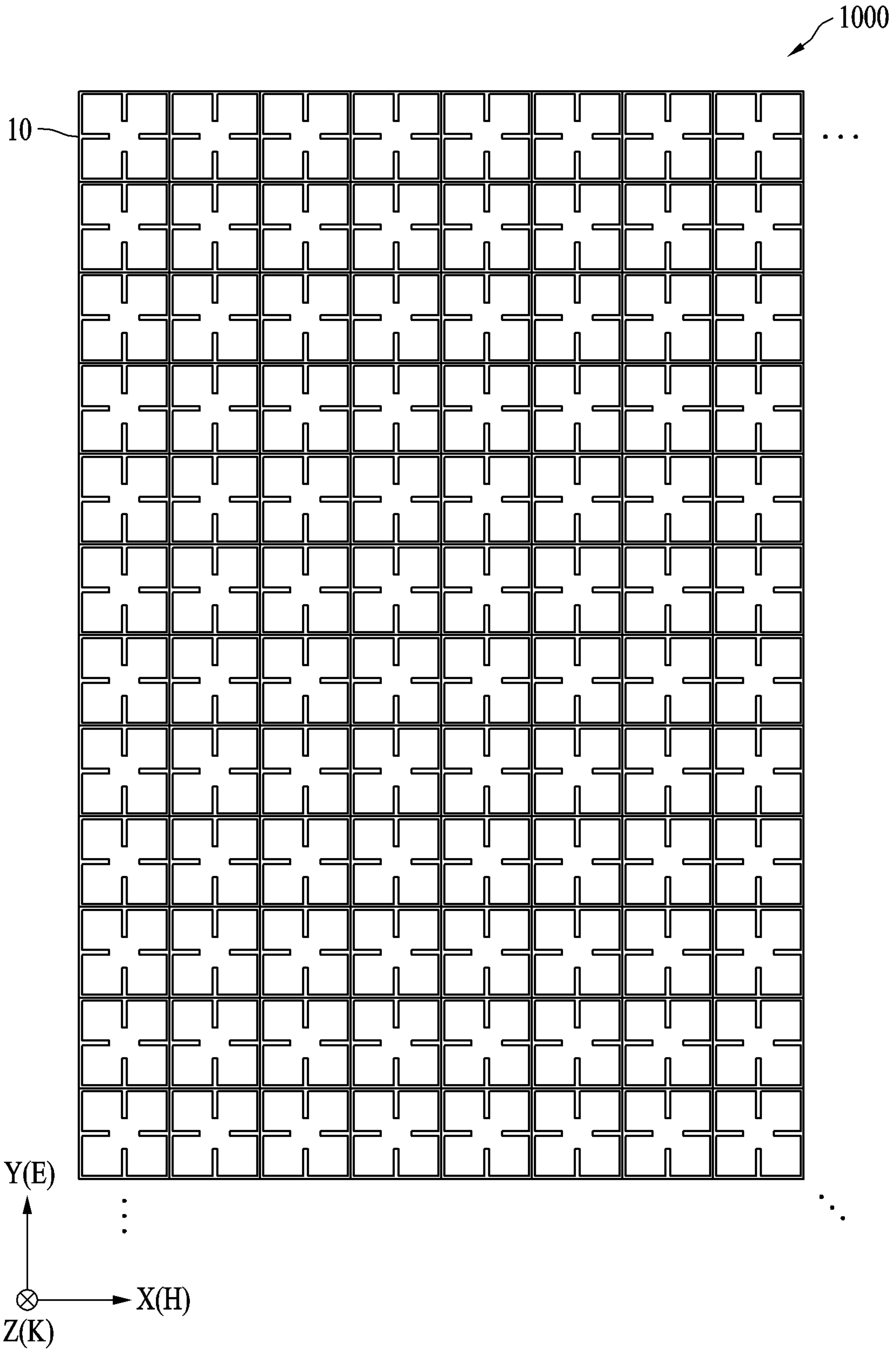
FIG. 19 is a diagram showing an example of a metamaterial absorber in which unit cells of the metamaterial absorber in FIG. 1 are arranged in the same plane.
Figure 20:
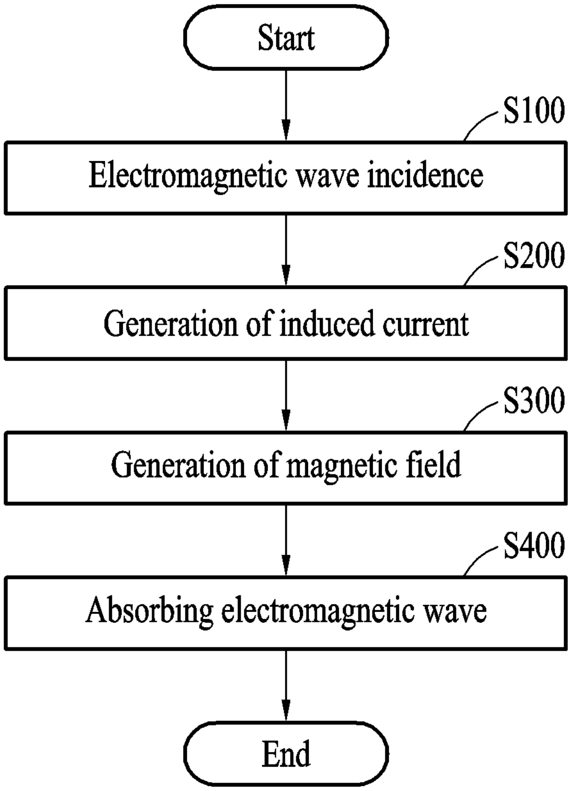
FIG. 20 is a flowchart showing an operation in which a metamaterial absorber in FIG. 19 absorbs electromagnetic waves.

FIG. 19 is a diagram showing an example of a metamaterial absorber 1000 in which the unit cells 10 of the metamaterial absorber in FIG. 1 are arranged in the same plane, and FIG. 20 is a flowchart showing an operation in which the metamaterial absorber 1000 in FIG. 19 absorbs an electromagnetic wave.

Referring to FIGS. 19 and 20, the metamaterial absorber 1000 may include a plurality of unit cells 10, each having a square shape. The plurality of unit cells 10 may be arranged in the same plane to form a flat plate structure to constitute the metamaterial absorber 1000.

For example, the plurality of unit cells 10 constituting the metamaterial absorber 1000 may have the same shape and size.

As each of the plurality of unit cells 10 absorbs electromagnetic waves, the metamaterial absorber 1000 may absorb electromagnetic waves incident thereto in a wide range.

As shown in FIG. 20, when the electromagnetic wave is incident to the metamaterial absorber 1000 according to the present disclosure in S100, the metamaterial absorber 1000 may generate an induced current in S200, generate a magnetic field in S300, and absorbs the electromagnetic wave in S400.

In this regard, the metamaterial absorber 1000 absorbing an electromagnetic wave may mean that the metamaterial absorber 1000 absorbs energy included in the electromagnetic wave. Furthermore, the absorption of electromagnetic waves by the metamaterial absorber 1000 may not be an active operation of the metamaterial absorber 1000 to absorb electromagnetic waves, but may be a passive effect due to the physical components and electromagnetic characteristics of the metamaterial absorber 1000.

Specifically, an electromagnetic wave of a broadband frequency may be incident onto the metamaterial absorber 1000 at various incident angles in S100. When the electromagnetic wave is incident onto the metamaterial absorber 1000, the induced current may be generated simultaneously in the first metal layer 100 and the second metal layer 500 in S200.

The induced magnetic field may be generated in S300 in the area of the intermediate layers 200 and 400 under the induced current of the first metal layer 100 and the induced current of the second metal layer 500. The electromagnetic wave incident onto the metamaterial absorber 1000 and the induced magnetic field may magnetically resonate with each other via impedance matching.

As the energy of the electromagnetic wave incident onto the metamaterial absorber 1000 is absorbed via the magnetic resonance, the metamaterial absorber 1000 may absorb the electromagnetic wave in S400.

In this regard, the operating frequency of the metamaterial absorber 1000 may be determined depending on the size and the shape of the plurality of unit cells 10 constituting the metamaterial absorber 1000. Since a magnitude of the induced magnetic field is maximum when the operating frequency is a resonant frequency, the metamaterial absorber 1000 may absorb the electromagnetic wave at the maximum level at the resonant frequency.

In one embodiment, each of the plurality of unit cells 10 included in the metamaterial absorber 1000 may include the first metal layer 100 including a conductive pattern, wherein the conductive pattern includes a square ring, and first to fourth protrusions extending respectively from four sides of the square ring and inwardly of the square ring, and in a perpendicular manner thereto, the first intermediate layer 200 disposed on a lower surface of the first metal layer 100 and made of polyimide, the resistor layer 300 disposed on a lower surface of the first intermediate layer 200, the second intermediate layer 400 disposed on a lower surface of the resistor layer 300 and made of polyimide, and the second metal layer 500 disposed on a lower surface of the second intermediate layer 400. The resistor layer 300 may increase the operating bandwidth of the operating frequency. A thickness of the resistor layer 300 may be in a range of 0.05 mm to 0.15 mm. The sheet resistance of the resistor layer 300 may be in a range of 530 $\Omega \cdot sq^{-1}$ to 550 $\Omega \cdot sq^{-1}$.

The metamaterial absorber 1000 according to the present disclosure may maintain the electromagnetic wave absorbance at a constant level even when the angle of incidence of the incident electromagnetic wave thereto changes. Furthermore, the metamaterial absorber 1000 according to the present disclosure has an operating bandwidth of a constant operating frequency and may maintain the electromagnetic wave absorbance at a constant level within the operating bandwidth range. Furthermore, the metamaterial absorber 1000 according to the present disclosure may be flexible, thin, and have a relatively low manufacturing cost. Therefore, the metamaterial absorber 1000 may maximize the electromagnetic wave absorption efficiency.

However, this has been described above, and redundant descriptions thereof will be omitted.

Although the embodiments are described above with limited drawings, various modifications and variations may be made to the above description by those skilled in the art. For example, appropriate results may be achieved even when the described techniques may be performed in a different order than the described order, and/or components of systems, structures, apparatuses, circuits, etc. as described may be combined with each other in a different form than the described form, or may be replaced or substituted with other components or equivalents.

Therefore, other implementations, other embodiments, and equivalent to the claims belong to the scope of the following claims.

The invention claimed is:

1. A unit cell of a metamaterial absorber comprising:

a first metal layer including a conductive pattern, wherein the conductive pattern includes a square ring, and first to fourth protrusions extending respectively from four sides of the square ring and inwardly of the square ring, and in a perpendicular manner thereto;

a first intermediate layer disposed on a lower surface of the first metal layer and made of polyimide;

a resistor layer disposed on a lower surface of the first intermediate layer;

a second intermediate layer disposed on a lower surface of the resistor layer and made of polyimide; and a second metal layer disposed on a lower surface of the second intermediate layer, wherein the resistor layer increases an operating bandwidth of an operating frequency of the unit cell of the metamaterial absorber, wherein a thickness of the resistor layer is in a range of 0.05 mm to 0.15 mm, wherein a sheet resistance of the resistor layer is in a range of 530 $\Omega \cdot sq^{-1}$ to 550 $\Omega \cdot sq^{-1}$.

2. The unit cell of the metamaterial absorber of claim 1, wherein the operating bandwidth of the operating frequency has a center frequency of 5.8 GHz and includes a band of 5.55 GHz to 6.05 GHz, wherein the unit cell of the metamaterial absorber has an electromagnetic wave absorbance of 97% or greater at an incident angle of 45° of the electromagnetic wave thereto in the operating bandwidth range.

3. The unit cell of the metamaterial absorber of claim 1, wherein the conductive pattern of the first metal layer includes a first conductive pattern, wherein a length of at least one side of the square ring of the first conductive pattern is in a range of 11 mm to 14 mm, a width of the square ring of the first conductive pattern is in a range of 0.1 mm to 0.2 mm, a width of each of the first to fourth protrusions of the first conductive pattern is in a range of 0.2 mm to 0.4 mm, and a length of each of the first to fourth protrusions of the first conductive pattern is in a range of 4 mm to 5 mm, wherein a thickness of the first metal layer is in a range of 30 μm to 40 μm.

4. The unit cell of the metamaterial absorber of claim 3, wherein a longitudinal length of the first intermediate layer is in a range of 11 mm to 14 mm, a transverse length of the first intermediate layer is in a range of 11 mm to 14 mm, and a thickness of the first intermediate layer is in a range of 1.5 mm to 1.9 mm.

5. The unit cell of the metamaterial absorber of claim 4, wherein a longitudinal length of the resistor layer is in a range of 11 mm to 14 mm, and a transverse length of the resistor layer is in a range of 11 mm to 14 mm.

6. The unit cell of the metamaterial absorber of claim 5, wherein a longitudinal length of the second intermediate layer is in a range of 11 mm to 14 mm, a transverse length of the second intermediate layer is in a range of 11 mm to 14 mm, and a thickness of the second intermediate layer is in a range of 0.4 mm to 0.6 mm.

7. The unit cell of the metamaterial absorber of claim 6, wherein a dielectric constant of each of the first intermediate layer and the second intermediate layer is 3.5, wherein a dielectric loss tangent of each of the first intermediate layer and the second intermediate layer is 0.0027.

8. The unit cell of the metamaterial absorber of claim 3, wherein a longitudinal length of the second metal layer is in a range of 11 mm to 14 mm, a transverse length of the second metal layer is in a range of 11 mm to 14 mm, and a thickness of the second metal layer is in a range of 30 μm to 40 μm.

9. The unit cell of the metamaterial absorber of claim 1, wherein the operating bandwidth of the operating frequency has a center frequency of 10 GHz and includes a 9.5 GHz to 10.5 GHz band, wherein the unit cell of the metamaterial absorber has an electromagnetic wave absorbance of 97% or greater at an incident angle of 45° of the electromagnetic wave thereto in the operating bandwidth range.

10. The unit cell of the metamaterial absorber of claim 1, wherein the conducive pattern of the first metal layer includes a second conductive pattern, wherein a length of at least one side of the square ring of the second conductive pattern is in a range of 8 mm to 11 mm, a width of the square ring is in a range of 0.1 mm to 0.2 mm, a width of each of the first to fourth protrusions of the second conductive pattern is in a range of 0.2 mm to 0.4 mm, and a length of each of the first to fourth protrusions of the second conductive pattern is in a range of 2.0 mm to 2.4 mm, wherein a thickness of the first metal layer is in a range of 30 μm to 40 μm.

11. The unit cell of the metamaterial absorber of claim 10, wherein a longitudinal length of the first intermediate layer is in a range of 8 mm to 11 mm, a transverse length of the first intermediate layer is in a range of 8 mm to 11 mm, and a thickness of the first intermediate layer is in a range of 1.0 mm to 1.2 mm.

12. The unit cell of the metamaterial absorber of claim 11, wherein a longitudinal length of the resistor layer is in a range of 8 mm to 11 mm, and a transverse length of the resistor layer is in a range of 8 mm to 11 mm.

13. The unit cell of the metamaterial absorber of claim 12, wherein a longitudinal length of the second intermediate layer is in a range of 8 mm to 11 mm, a transverse length of the second intermediate layer is in a range of 8 mm to 11 mm, and a thickness of the second intermediate layer is in a range of 0.4 mm to 0.6 mm.

14. The unit cell of the metamaterial absorber of claim 13, wherein a dielectric constant of each of the first intermediate layer and the second intermediate layer is 3.5, wherein a dielectric loss tangent of each of the first intermediate layer and the second intermediate layer is 0.0027.

15. The unit cell of the metamaterial absorber of claim 14, wherein a longitudinal length of the second metal layer is in a range of 8 mm to 11 mm, a transverse length of the second metal layer is in a range of 8 mm to 11 mm, and a thickness of the second metal layer is in a range of 30 μm to 40 μm.

16. A metamaterial absorber comprising a plurality of unit cells, wherein the plurality of unit cells are arranged in the same plane to form a plate structure, wherein each of the plurality of unit cells includes:

a first metal layer including a conductive pattern, wherein the conductive pattern includes a square ring, and first to fourth protrusions extending respectively from four sides of the square ring and inwardly of the square ring, and in a perpendicular manner thereto;

a first intermediate layer disposed on a lower surface of the first metal layer and made of polyimide;

a resistor layer disposed on a lower surface of the first intermediate layer;

a second intermediate layer disposed on a lower surface of the resistor layer and made of polyimide; and a second metal layer disposed on a lower surface of the second intermediate layer, wherein the resistor layer increases an operating bandwidth of an operating frequency of the unit cell of the metamaterial absorber, wherein a thickness of the resistor layer is in a range of 0.05 mm to 0.15 mm, wherein a sheet resistance of the resistor layer is in a range of 530 $\Omega\cdot sq^{-1}$ to 550 $\Omega\cdot sq^{-1}$.

* * * * *